United States Patent [19]

Parish et al.

[11] 4,135,896
[45] Jan. 23, 1979

[54] GAS PURIFIER HAVING RECHARGEABLE ADSORBER FILTER WITH REMOVEABLE RECHARGEABLE SAMPLE CANISTER

[75] Inventors: Harold C. Parish, Dublin; Ivars S. Spulgis, Columbus; Thomas N. Hickey, Worthington; David R. Hoy, Grove City, all of Ohio

[73] Assignee: CVI Corporation, Hilliard, Ohio

[21] Appl. No.: 640,108

[22] Filed: Dec. 11, 1975

[51] Int. Cl.² .................................................. B01D 53/30
[52] U.S. Cl. ...................................... 55/270; 55/387; 55/484; 73/38; 73/421.5 R
[58] Field of Search ............... 55/270, 74, 316, 387, 55/474, 479, 478, 481, 484, 359, 485–487, 502–505, 507; 210/85; 73/38, 421.5 R; 222/189; 209/236

[56] References Cited

U.S. PATENT DOCUMENTS

| 494,837 | 4/1893 | Bellamy | 210/266 |
|---|---|---|---|
| 2,096,851 | 10/1937 | Fricke | 55/316 |
| 2,150,930 | 3/1939 | Lassiat | 55/476 |
| 2,579,477 | 12/1951 | Dauphinee | 55/270 |
| 2,966,234 | 12/1960 | Alexander | 55/359 |
| 3,141,441 | 7/1964 | Russell | 209/236 |
| 3,143,997 | 8/1964 | Norberg et al. | 55/274 |
| 3,271,089 | 9/1966 | Krellen | 55/387 |
| 3,429,103 | 2/1969 | Taylor | 55/74 |
| 3,658,467 | 4/1972 | Maeck | 55/75 |
| 3,678,662 | 7/1972 | Grote | 55/486 |
| 3,747,308 | 7/1973 | Versluis et al. | 55/387 |
| 3,847,574 | 11/1974 | Fish | 55/476 |
| 3,873,287 | 3/1975 | Barneby | 55/484 |
| 3,925,046 | 12/1975 | Hickey et al. | 55/484 |
| 3,961,920 | 6/1976 | Gilbert | 55/484 |

Primary Examiner—Bernard Nozick
Attorney, Agent, or Firm—Charles N. Quinn

[57] ABSTRACT

A gas purifier having a removeable sample canister apparatus and gas adsorber in combination is provided for use in atmospheric containment and cleanup systems in nuclear power plants and other air and gas filtering applications. The sample canister is particularly adapted for removeable attachment to and use in combination with a gas adsorber having a plurality of parallel spaced filter beds. The sample canister is designed to permit the sampling of adsorbent material at discrete time intervals without disturbing adsorbent material in the filter beds and without disturbing the structural integrity of the gas adsorber to which the sample canister is attached.

26 Claims, 21 Drawing Figures

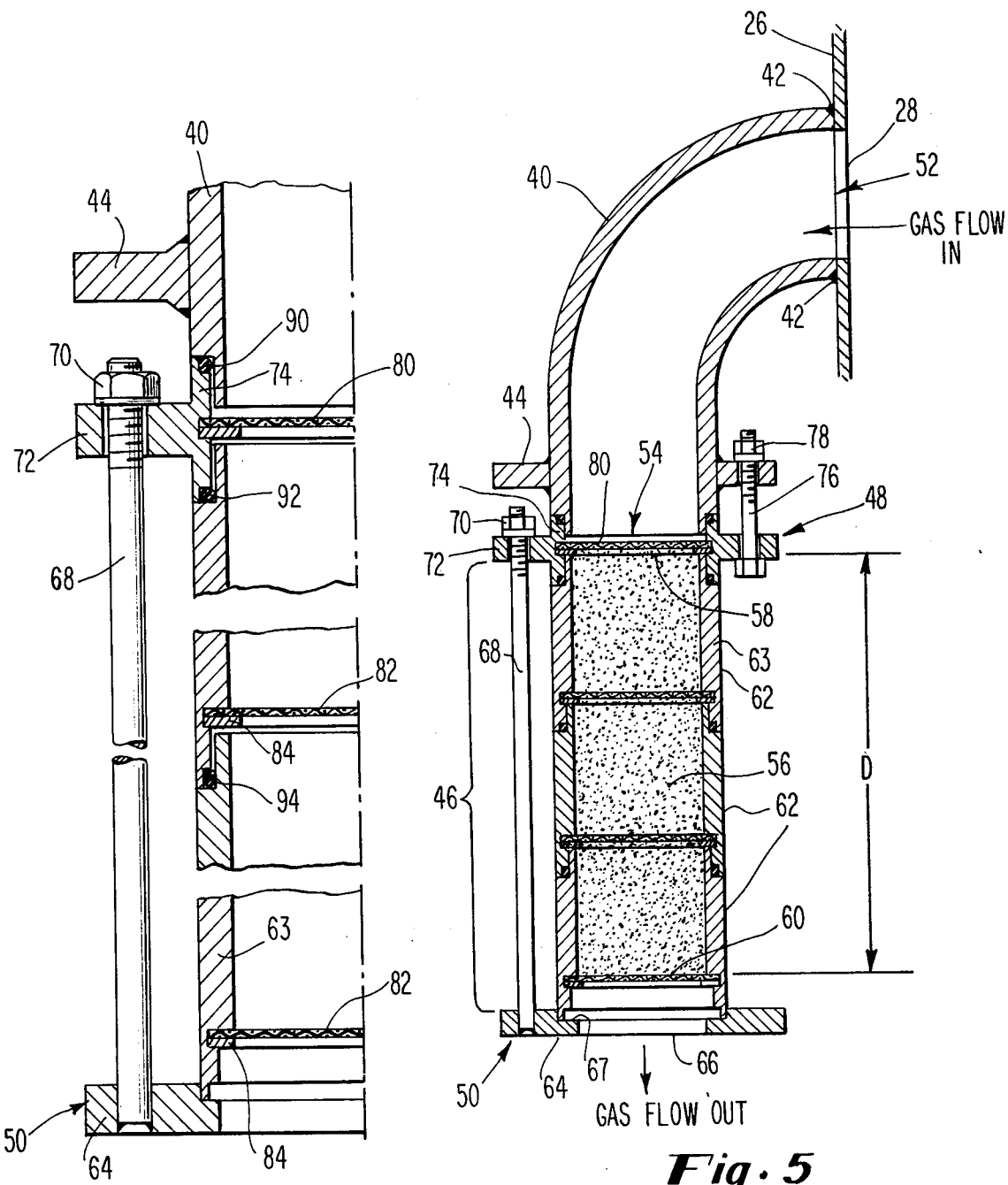

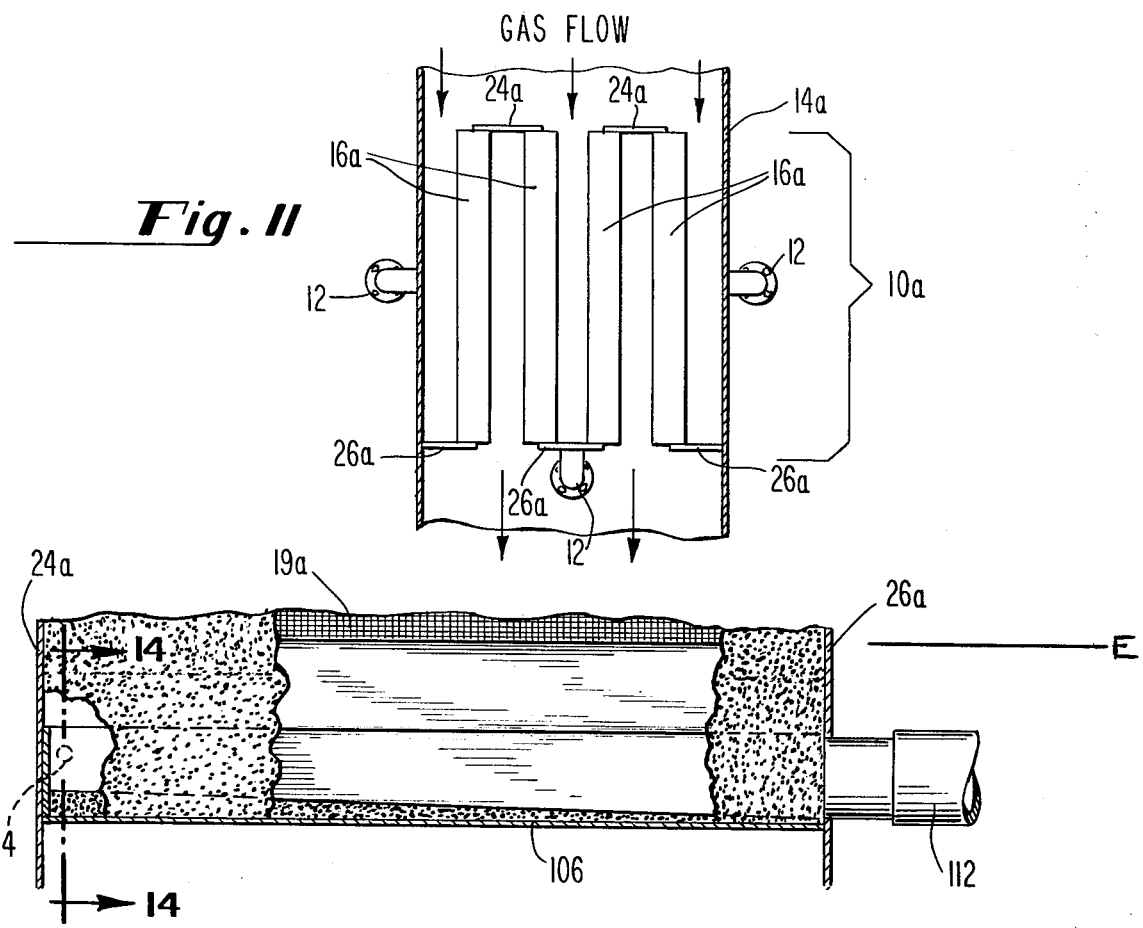
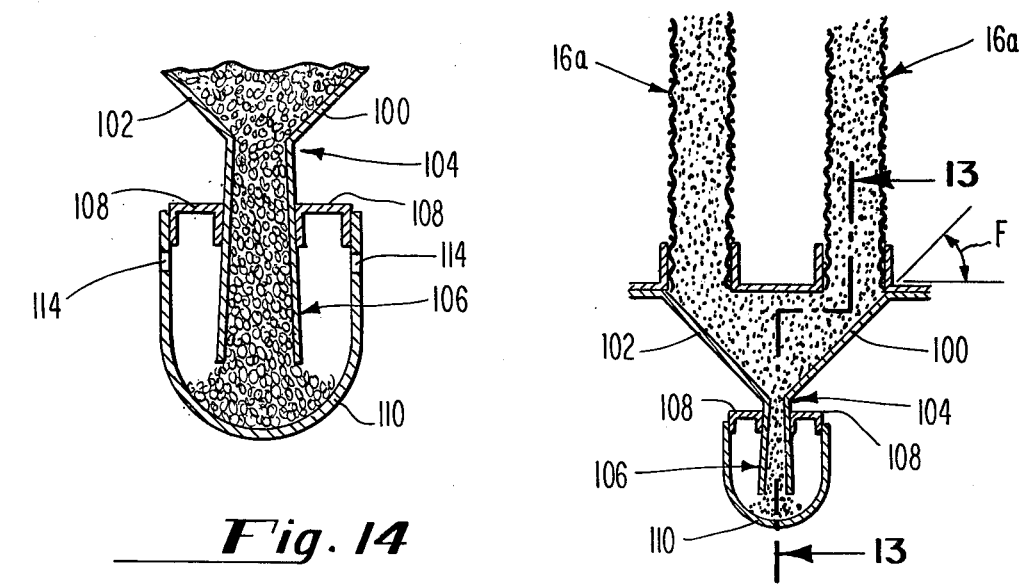

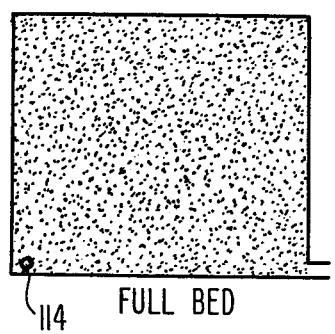
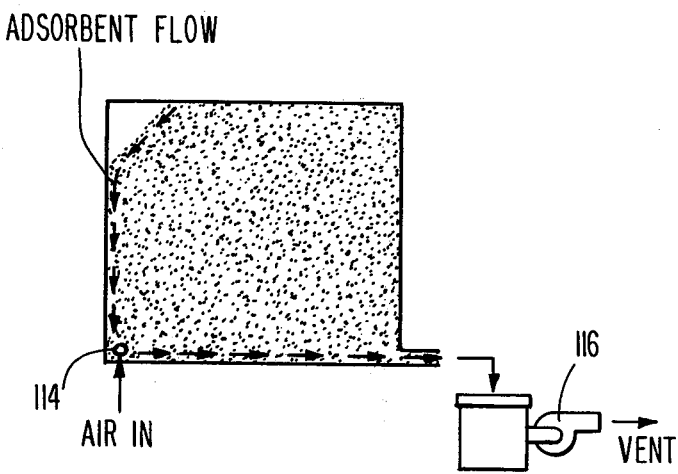
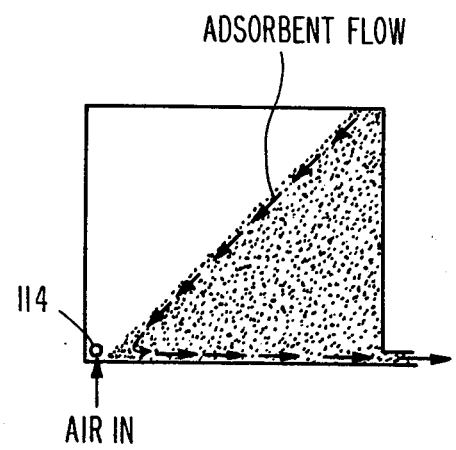
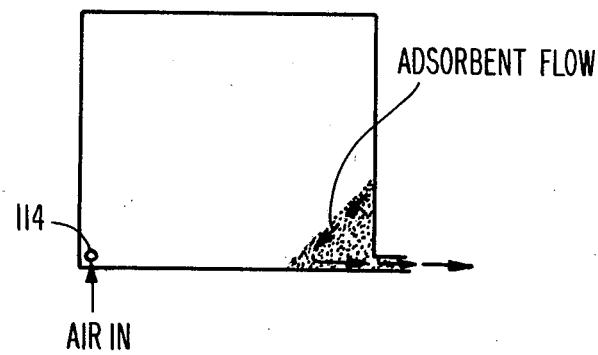
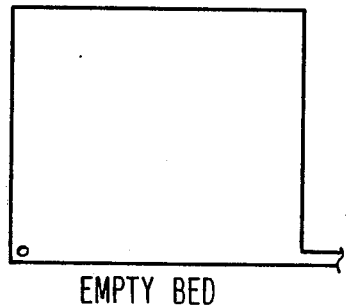

GAS PURIFIER HAVING RECHARGEABLE ADSORBER FILTER WITH REMOVEABLE RECHARGEABLE SAMPLE CANISTER

CROSS REFERENCE TO RELATED PATENTS

Reference is made herein to U.S. Pat. Nos. 3,964,887, "Radioactive Gas Standby Treatment Apparatus with High Efficiency Rechargeable Charcoal Filter," and 3,964,890, "Rechargeable Particulate Filter for Radioactive Contaminated Gas Streams." Reference is also made to U.S. Pat. No. 4,030,639, "Charcoal Adsorber Filter Fill System."

BACKGROUND OF THE INVENTION

1. Field of the Invention

The present invention is in the field of gas purifiers, sample canisters for use with gas adsorbers and kits for the assembly thereof and is even more particularly in the field of sample canister-adsorber combinations use in gas filtration systems in nuclear power plants. Specifically, the present invention relates to a gas purifier, having in combination a sample canister, and kit for assembly thereof, with an adsorber having a filter for containment of granular adsorbent material, where the sample canister portion is designed for passage of gas through a portion of adsorbent material and permits removal of the adsorbent material for testing to determine whether the adsorbent material has lost its efficacy as an adsorbent. The sample canister portion of the apparatus is designed to allow removal of the sample adsorbent for testing without disturbing adsorbent material in the main adsorber of the gas purifier.

2. Description of the Prior Art

Various test methods and apparatus have been used in conjunction with filtering apparatus in gas filtration systems to monitor the continuing efficacy of the filter apparatus. The most simple of such apparatus is the ordinary removeable particulate filter which can be visually inspected to determine to what extent it has become clogged or otherwise inoperative. Similarly, small sample filters operating in a diverted channel of gas are known in the art to be used as monitoring devices for determining when a gas filter has lost its efficacy.

With the development of nuclear power plants, the United States Nuclear Regulatory Commission (NRC) has required that atmospheric containment and clean-up systems be provided in these plants to minimize the release of radioactive material to the environment during normal operation or in case of an accident. The NRC has required these systems to be designed to permit appropriate periodic inespection and testing to assure the continuing structural integrity, functional capability and operability of the systems.

Air filtration and adsorption systems designated by the NRC as Engineered Safety Feature (ESF) systems are used as atmospheric clean-up systems in light water-cooled nuclear power plants for mitigating the consequences of postulated accidents. See NRC Regulatory Guide 1.52 for detailed design requirements.

Typical air filtration and clean-up systems utilize adsorber filter apparatus of the type previously referred to and typically use activated carbon as the adsorbent material. Two systems which have successfully met the NRC design requirements for gas filtration systems are those disclosed and claimed in pending U.S. Pat. No. 3,964,890 and in U.S. Pat. No. 3,925,046. Other adsorber filter apparatus is disclosed in U.S. Pat. Nos. 3,815,335 and 3,873,287, however, these apparatus are thought to fail to meet NRC design requirements.

It is recognized that industrial contaminants, pollutants, temperature and relative humidity contribute to the aging of gas purifiers and their adsorbent material and reduce the effectiveness of the adsorbent material in the gas purifier. Aging and weathering will vary from site to site and must be considered during the design and operation of the adsorber filter system. The NRC requires periodic testing of each adsorber filter system to verify the efficiency of the components and the efficacy of the adsorbent in order to assure continuing reliability of the adsorber filter system.

The adsorbent used in ESF systems must be tested upon installation, and at specified intervals thereafter, to confirm a specified minimum penetration of radioactive iodine or methyl iodide through the system. This can be done by laboratory testing of representative samples of activated carbon or other adsorbent materials which have been simultaneously exposed to the same gas flow conditions as the adsorbent material in the absorber filter section of the system. The NRC further requires that each representative sample should be not less than 2 inches in both length and diameter and should have the same qualification and batch test characteristics as the system adsorbent. It is desirable that the representative sample of adsorbent material be capable of being obtained, after having been exposed to the same gas flow conditions as the adsorbent in the adsorbent filter, without disturbing or disrupting the adsorbent material in the adsorber filter. The NRC requires that there be a sufficient number of representative samples located in parallel flow with the adsorber filter section of the gas purifier system for estimating the degree of penetration by radioactive contaminants of the adsorbent material in the system throughout the adsorbent material's service life.

Accordingly, it is apparent that prior techniques which used a "grain thief cup" to reach down into adsorbent material in the adsorber filter are not acceptable. Such techniques have the disadvantage that the sample withdrawn may not be representative unless it is withdrawn uniformly from the inlet side to the outlet side of an adsorbent bed because the inlet side of the bed where air enters is more subject to weathering than the outlet side. Furthermore, if a grain thief is used, the adsorbent material in the adsorber filter will be disturbed thereby possibly degrading the performance of the adsorber filter.

SUMMARY OF THE INVENTION

Heretofore, it has not been known to construct a gas purifier having a sample canister and adsorber filter in combination. The present invention provides a gas purifier having a sample canister and adsorber filter in combination, which overcomes the aforementioned disadvantages and meets the aforementioned requirements of the NRC.

In accordance with the foregoing, it is a principal object of the present invention to provide a gas purifier having a sample canister and a kit for the assembly and maintenance thereof in combination with an adsorber apparatus for use in a nuclear power plant or other facility requiring a gas filtration system, which sample canister portion is suitable for containment therein of sample adsorbent material the same as used in the adsorber of the gas purifier.

It is a further object of the present invention to provide a gas purifier having in combination sample canister and adsorber, at least a portion of which sample canister can be removed from the adsorber apparatus when granular adsorbent within the sample canister must be tested.

It is a further object of the present invention to provide a gas purifier having a sample canister which can be removed from an adsorber, for testing the adsorbent material, without disturbing the adsorbent material in the adsorber portion of the gas purifier apparatus.

It is a further object of the present invention to provide a gas purifier, having a sample canister and an adsorber, from which the adsorbent material may be removed with great facility and speed.

It is a further object of the present invention to provide a gas purifier having a sample canister and kit for the assembly thereof which upon removal of a portion of the sample canister from the adsorber has a remaining structure suitable for sealing the area from which the sample canister was removed thereby preventing flow of gas through the area vacated by the first portion of the sample canister.

It is a further object of the present invention to provide a sample canister apparatus which is appropriate for use with a wide variety of adsorber systems.

It is a further object of the present invention to provide a sample canister which can be constructed and assembled in a range of configurations so as to contain variable amounts of adsorbent therein.

It is a further object of the present invention to provide a gas purifier having in combination a sample canister and an adsorber wherein the sample canister is disposed so that gas passing through the sample canister passes through the same thickness of adsorbent material as gas passing through the adsorber.

It is a further object of the present invention to provide a kit for assembly of a sample canister which is adapted for employment of a variable number of segments containing adsorbent material therein as a part of the sample canister.

It is a further object of the present invention to provide a kit for assembly of a sample canister having a variable number of segments for containing adsorbent material whereby the sample canister is adapted for assembly of a number of segments which in the assembled condition expose gas passing therethrough to the same thickness of adsorbent material as the thickness of individual adsorbent filter beds through which gas must pass in an associated adsorber.

It is a further object of the present invention to provide a kit for assembly of a sample canister which kit has as a portion thereof apparatus useable to fill a remaining portion of the sample canister kit with adsorbent in such a fashion that a substantially uniform packing density of the adsorbent material in the sample canister is obtained.

It is a further object of the present invention to provide a kit for assembly of a sample canister for use in combination with an adsorber, which kit has as a portion thereof apparatus used to fill a remaining portion of the sample canister kit with adsorbent material in the same manner as the adsorber is filled so that the sample canister and the adsorber filter both contain adsorbent material packed at the same density.

It is a further object of the present invention to provide a gas purifier having in combination a sample canister and adsorber wherein the sample canister is disposed such that upon gas flow through the gas purifier, the static pressure drop experienced by gas flowing through the sample canister is substantially the same as the static pressure drop experienced by gas flowing through an adsorbent filter bed in the adsorber portion of the gas purifier.

It is a further object of the present invention to provide a sample canister having a safety basket surrounding at least a portion of the sample canister and adapted for filling with adsorbent to a level where the sample canister is surrounded by adsorbent of a thickness whereby any gas which escapes from the sample canister without having passed through the full thickness of adsorbent material in the sample canister, must pass through the surrounding adsorbent in the safety basket before escaping to ambient atmosphere.

It is a further object of the present invention to provide a sample canister having as a part thereof a safety basket surrounding at least a portion of the sample canister, adapted for filling with adsorbent of such amount that joints in the sample canister are surrounded by adsorbent of an amount whereby any gas which escapes through a joint in the sample canister must pass through a thickness of surrounding adsorbent at least equal to the thickness of an absorbent bed in the adsorber portion of the gas purifier before escaping to ambient atmosphere.

It is a further object of the present invention to provide a sample canister which permits the periodic testing of adsorbent material in such a way as to comply with NRC Regulatory Guide 1.52.

These and other objects of the present invention will be apparent to those of ordinary skill in the art from an inspection of the attached drawing figures and from a reading of the following specification and the appended claims.

The present invention, in the preferred embodiment, solves the problems present in the prior art by providing a gas purifier having a sample canister in combination with an adsorber, by providing means for filling a portion of the sample canister with adsorbent and by providing means for sealing-off a portion of the sample canister, when the adsorbent which has previously been placed therein has been removed and it is desired to prevent any gas from passing through the remaining portion of the sample canister. The present invention also provides a gas purifier having a sample canister and adsorber in combination wherein the length of the sample canister can be varied with consequent variance of the amount of sample adsorbent contained therein so as to adapt for use with adsorbers having different filter bed thicknesses.

BRIEF DESCRIPTION OF THE DRAWINGS

FIG. 5 is a side sectional view of a sample canister taken along the lines and arrows 5—5 of FIG. 1.

FIG. 6 is a broken half sectional view of a sample canister showing in detail the means by which the preferred embodiment of the sample canister is assembled.

FIG. 7 is a top sectional view of a sample canister which has been improperly installed in combination with adsorber, showing adsorbent which has settled and hence allow undesirable channeling effects when gas passes through the sample canister. Proper installation is shown in FIGS. 1, 4 and 5.

FIG. 11 is a top view of a second embodiment of the gas purifier of the present invention, showing three sample canisters mounted on the adsorber in different positions and with the housing portion of the adsorber broken away to reveal the configuration of the filter beds therein.

FIG. 12 is a partial broken sectional view of the bottom portion of two filter beds of the embodiment of the gas purifier of the present invention shown in FIG. 12, illustrating a portion of means for emptying the filter beds of adsorbent.

FIG. 13 is a broken partially sectioned side view of the bottom portion of the filter beds and the means for emptying the filter beds of adsorbent shown in FIG. 12.

FIG. 14 is a sectioned view of a bottom portion of a means for emptying the filter beds of adsorbent taken along the lines and arrows 14—14 in FIG. 13.

FIGS. 15A through 15E are schematic representations of the progressive removal of adsorbent from a filter bed when the means for emptying the filter beds of the adsorbent illustrated in FIGS. 11 through 14 is utilized.

In the drawings, identical numbers represent parts having identical or substantially similar names and functions in different drawings of the present invention. Lower case alphabetic letters denote different embodiments of the present invention.

DESCRIPTION OF THE PREFERRED EMBODIMENTS

Figure 1:
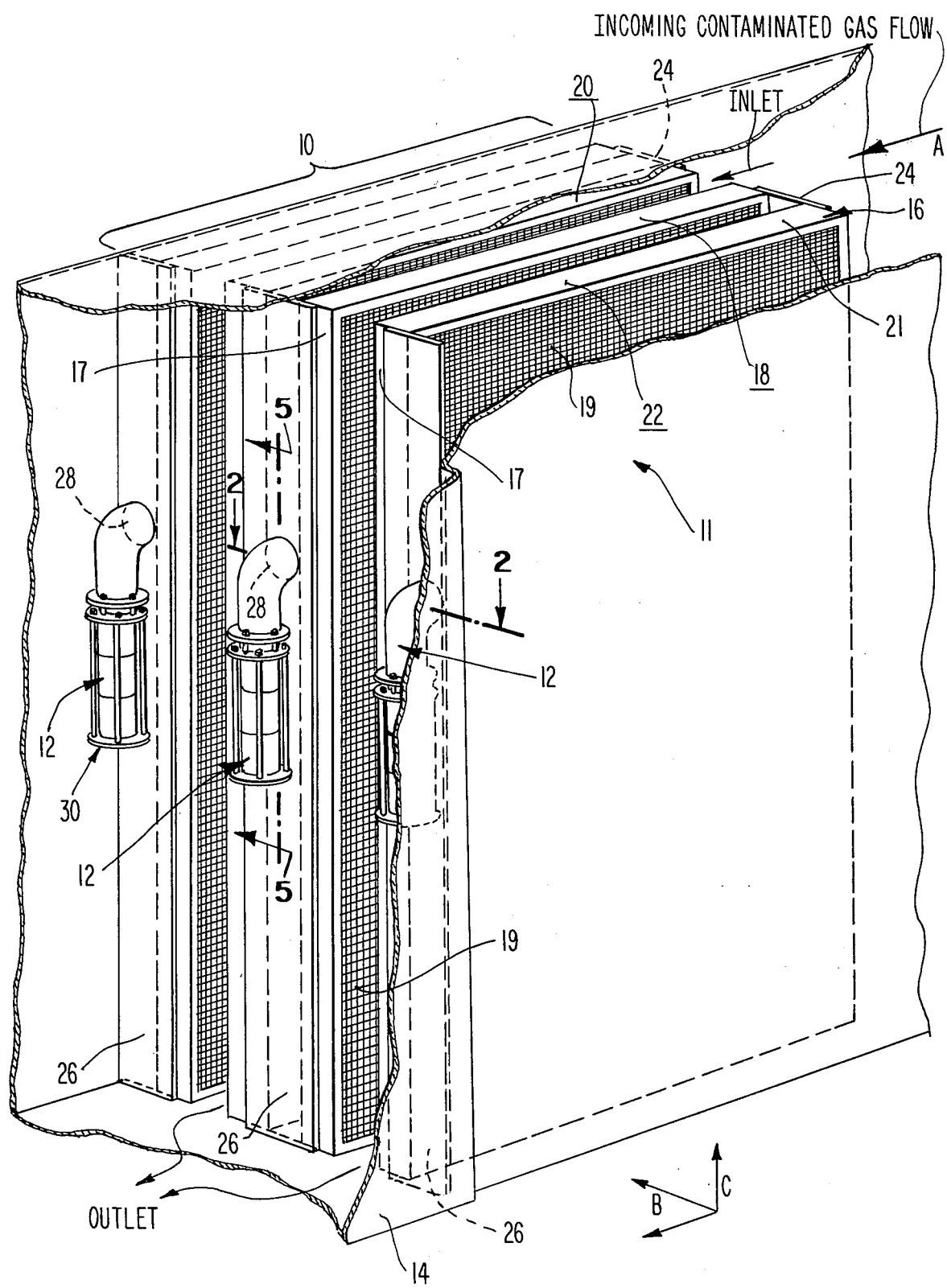
FIG. 1 is a broken-away isometric view of a gas purifier, with the gas ducting broken away so as to show three sample canisters installed on the adsorber so as to expose sample adsorbent contained in the sample canisters to the same flow conditions as experienced by adsorbent in the adsorber.

Reference is now made to FIG. 1 which illustrates the gas purifier of the present invention having three sample canisters for containment of adsorbent material therein in combination with an adsorber designated generally by horizontal bracket 10. The sample canisters have been designated generally as 12.

To understand the function and operation of the gas purifier, it is necessary that operation of adsorber portion 10 be understood. Adsorber 10 has as a part thereof a housing means or duct 14. The duct channels air or some other gas to be filtered and purified into a filter portion 11 of the adsorber 10 with the flow of incoming air or gas denoted by arrow A and its associated legend. Incoming and outgoing gas flows are preferably parallel, along a line parallel to arrow A. This is referred to herein as a longitudinal direction. Lines, structures and gas flows perpendicular to the longitudinal direction, parallel to reference arrow B are referred to as being in the lateral or transverse direction while lines, structures and gas flows parallel to reference arrow C are referred to as being in the vertical direction. Duct 14 is closed around filter portion 11 of adsorber 10 and is broken away in FIG. 1 to show sample canisters 12 in combination with adsorber 10. Incoming contaminated gas initially passes into areas between preferably laterally or horizontally spaced preferably vertically oriented parallel adsorbent filter beds 16. Each spaced adsorbent filter bed 16 consists substantially of a parallelepiped or hexahedron shaped structure, having two preferably vertical solid side walls 17, one proximate the inlet and the other proximate the outlet of housing 14, and two preferably vertical perforate side walls 19 of screen or mesh-type material. The parallelepiped or hexahedron shaped filter bed is preferably either a right parallelepiped or a right hexahedron. However, this is not required and all parallelepiped shaped structures and all hexahedron shaped structures which function in the various embodiments of this invention are included within the purview hereof. Means are provided at each bed's preferably horizontal top walls 21 and bottom walls, not clearly visible in FIG. 1, for respectively filling and emptying the bed. These means are not shown, in order to aid the clarity of the drawing. Any suitable means, such as doors, hatches, etc. may be used for access to the filter beds to fill the beds with adsorbent and to drain adsorbent therefrom. See referenced United States patent application Ser. No. 3,964,890 for an exemplary embodiment of means at the bottom of filter beds for emptying them. Filter beds 16 preferably are substantially identical one to another.

Individual spaced particulate adsorbent filter beds of adsorber 10 have been designated 18, 20 and 22. It is to be understood that the adjective "particulate", when used in describing a filter bed, modifies, either implicitly or explicitly, the word "adsorbent". Specifically, when adsorber 10 is operative, filter beds 18, 20 and 22, sometimes called cells, must be filled with granular or particulate adsorbent material. In this context the words "granular" and "particulate" are used interchangeably.

The adsorbent material adsorbs radioactive gaseous impurities from the gas stream passing through the gas purifier. Only incidentally will particles or particulate matter be filtered out of the gas stream; this would occur if any particulate matter became lodged in the perforate walls or screens of the filter beds, or became lodged in the interstices around the granules of adsorbent in the filter beds or was too large to pass through the perforate walls or screens of the filter beds. Normally such particles or particulate matter are filtered from the gas stream by "particulate filters" located in ductwork upstream from the gas purifier. See referenced U.S. Pat. No. 3,964,887 for an exemplary embodiment of particulate filters located upstream of the gas purifier. Consequently, in normal operation no particulate matter will be in the contaminated gas stream when the contaminated gas stream reaches the gas purifier.

Adsorbent material is contained within the filter beds. Gas passes through an adsorbent filter bed in the adsorber by passing through an inlet wall of the two perforate walls, then substantially laterally through the adsorbent material contained in the bed and out of the bed through an outlet perforate wall.

Alternate spaces between preferably parallel preferably vertically oriented filter beds are blocked at the inlet and at the outlet. Thus any contaminated gas coming in through one of the spaces between the spaced filter beds 16 at the inlet, such as the space between bed 18 and bed 20, must pass through either bed 18 or bed 20 to exit from adsorber 10 through one of the outlets between beds 16, at the left hand portion of FIG. 1. This pattern of gas flow is illustrated by curved lines denoting flow of gas in FIG. 2. Duct or housing 14 fits tightly around the filter; the connections between the housing and the filter are preferably continuously welded so as to prevent any gas leakage at the joints. No gas can pass around the adsorber 10 while traveling through duct 14, it must pass through adsorbent contained in spaced filter beds 16 or through one of the sample canisters 12.

The sample canisters 12 provides means by which the adsorbing or filtering efficacy of adsorbent material in adsorber 10 can be determined. A plurality of sample canisters normally are used in combination with a single adsorber to determine at discrete time intervals the filtering efficacy of the adsorbent material in the filter. Conventionally, the adsorber and the sample canisters will be filled or charged with adsorbent material when the gas purifier is first installed. The efficiency of this material as an adsorbent will decrease with time and will decrease at an accelerating rate when the system is tested or placed in operation. When the adsorbing or filtering efficacy of the absorbent material falls below a predetermined level, the old adsorbent material in the adsorber filter must be replaced with virgin adsorbent material.

Figure 9:
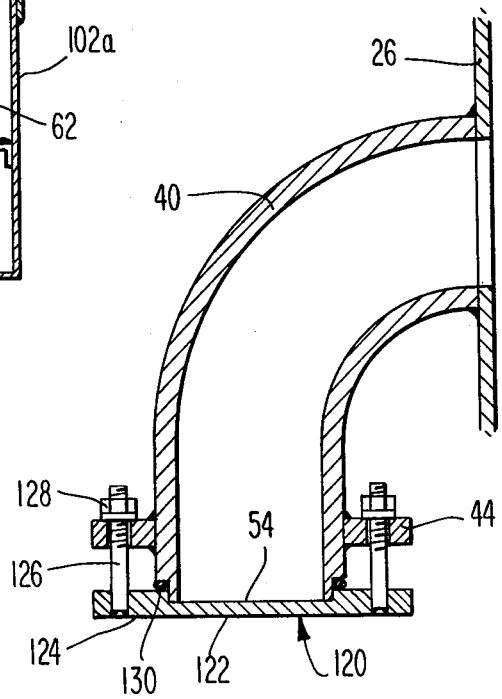
FIG. 9 is a side sectional view of a channeling means portion of a sample canister with a cover attached to the channel thereby sealing the outlet end of the channel.

For periodic testing of the adsorbing or filtering efficacy characteristic of the adsorbent material, the adsorber is equipped with a number of sample canisters. One preferable arrangement is shown in FIG. 1. Periodically one or more containment means portions of the sample canisters will be removed from a channeling means portion of the canister for testing of the sample granular adsorbent contained therein. When the containment means portion is removed from the channel means, the channel from the adsorbent will be sealed with a cover so as to prevent escape of gas from the adsorber. The sealed configuration of the sample canister is illustrated in FIG. 9.

Once the filtering efficacy of the adsorbent material in the adsorber has reached a level where the adsorbent material in the adsorber must be replaced, the seals or covers can be removed from the channels whereupon the containment means portions of the sample canisters 12 can be filled with fresh adsorbent material and reconnected to adsorber 10.

Still referring to FIG. 1, sample canisters 12 preferably are attached to outlet end blocking plates 26 by curved channeling means having passages therethrough with inlet and outlet ends. Consequently gas flows into a sample canister through hole 28 in outlet blocking plate 26 and through the sample canister 12. Gas will exit from the sample canister through a hole at the bottom surface thereof denoted 30 in FIG. 1.

Figure 2:
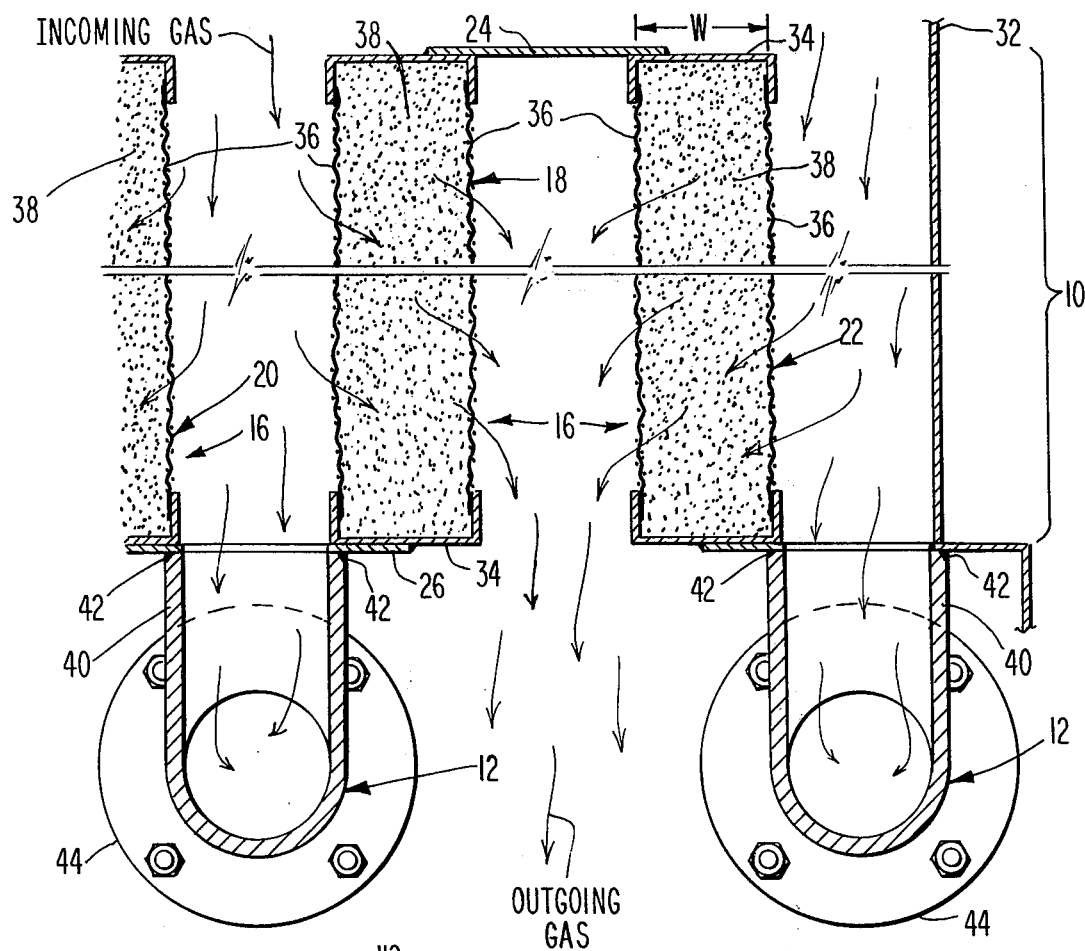
FIG. 2 is a partial broken sectional view of a portion of the gas purifier shown in FIG. 1, taken along the lines and arrows 2—2 in FIG. 1, with two sample canisters shown in section.

Reference is made to FIG. 2, where the gas flow pattern through the adsorber and the sample canisters is shown by curved arrows. Again visible are inlet and outlet end blocking plates 24 and 26. A side wall of the duct or housing, which also can comprise a side wall of the filter depending on the configuration of the filter, has been denoted 32, and with filter beds 16 shown having vertical solid side walls 34, and perforate screen or mesh portions 36. Beds 16 contain adsorbent material 38. Most incoming contaminated gas entering adsorber 10 passes through the perforate screen or mesh portions of adsorbent filter beds 18, 20 and 22, through adsorbent material contained therein and outward in the direction shown. However, a small portion of the gas, rather than flowing through the filter beds 16, passes through the sample canisters 12. Each sample canister 12 is designed so that flow resistance encountered by entering gas is substantially the same as encountered by gas which passes through a filter bed 16. Thus sample adsorbent material contained in a sample canister 12 is exposed to substantially the same flow conditions as adsorbent contained in the individual adsorbent filter beds 18, 20 and 22. Consequently, tests of adsorbent contained in sample canisters 12 can provide accurate data as to the degree adsorbent material in filter beds 18, 20 and 22 remains effective as an adsorbent.

For meaningful tests to determine the filtering efficacy of sample adsorbent in a sample canister, the sample adsorbent material must be exposed to the same gas flow conditions as experienced by adsorbent material in the adsorber. Specifically, flow conductance of the adsorbent material in the sample canister must be substantially the same as flow conductance of adsorbent material in the adsorber. Flow conductance is primarily a function of the packing density of the adsorbent and the distance gas must flow through the adsorbent. Extensive study, design and testing of the gas purifier of the present invention have resulted in embodiments which through demonstration testing have proved to produce flow through the sample canisters representative of flow through the adsorber filter beds. This has been achieved by equalizing flow conductance through the sample canisters and the filter beds.

Still referring to FIG. 2, channeling means portion 40 of sample canister 12, which is a means for directing gas entering adsorber 10 into the sample canister is preferably secured to adsorber 10 by seal weld 42. However, any suitable substantially gastight means may be used to secure the channeling means to the adsorber. Welding is a particularly suitable technique when the channel means and the adsorber are steel since it results in a gastight connection between the adsorber and the sample canister. This is required so that contaminated radioactive gas coming into the adsorber cannot escape therefrom without having passed through adsorbent material in either the beds or the sample canisters.

Also visible in FIG. 2 is an external flange portion 44 of channel means 40, disposed circumferentially around channel means 40 at its oulet end. External flange portion 44 works in conjunction with a connection means to connect the channel means to a containment means portion of the sample canister when the sample canister is in an assembled condition. This connection is described in more detail below.

FIG. 5 is a sectional view of the preferred embodiment of the sample canister. Channeling means 40 extends outwardly and preferably curved downwardly preferably from outlet blocking plate 26 of the adsorber and is attached thereto by welds 42. Gas enters the sample canister through hole 28 in outlet blocking plate 26 and travels through the passageway in channeling means 40 to the containment means designated by vertical bracket 46. Containment means 46 is connected to channeling means 40 by connection means 48. Channeling means 40 has inlet end 52 and outlet end 54 for flow of gas therethrough. Gas entering channeling means 40 passes therethrough and then passes through containment means 46 and around and through the sample granular adsorbent material 56 therein, through an outlet end of containment means 46 and through a hole in retention means 50, as per the arrows and legend in FIG. 5.

Containment means 46 has inlet end 58 and outlet end 60, and can be a single structure containing the sample adsorbent therein or may be comprised of one or more preferably interchangeable containment means segments, depending on the thickness of the filter beds. In the preferred embodiment illustrated, the containment means 46 comprises a plurality of interchangeable containment means segments 62, each having an inlet end and an outlet end, where the inlet end of each segment is connectable either to connection means 48 or to the outlet end of another containment means segment. Each containment means segment has a passage therethrough for containing sample adsorbent 56.

Containment means 46, whether comprised of a single structure or a plurality of containment means segments 62 connected together seriatum as in FIG. 5, is retained against connection means 48 by retention means 50. Retention means 50 preferably consists of ring-like structure 64 having hole 66 therethrough of substantially the same shape and cross-sectional area as the shape of the passage through containment means 46. Ring-like structure 64 preferably has at least one tie rod-like partially threaded rod 68 extending therefrom. Partially threaded rod 68 extends sufficiently far from ring-like structure 64 so that it can extend through external flange portion 72 of connection means 48. A nut 70, when in threaded engagement with rod 68 acts to secure ring-like structure 64 of retention means 50 tightly against containment means 46 and to secure the containment means securely against connection means 48. Hole 66 in retention ring 64 has a continuous circumferential notch 67 therein with an inside diameter only slightly larger than the outside diameter of containment means 46 so containment means 46 will fit tightly into the notch when retention means 50 is placed in engagement with connection means 48.

Connection means 48 has ring-like structure 74 with a hole in the center of substantially the same size and shape as the passage through channel means 40. Extending circumferentially around ring-like structure 74 is external flange portion 72 of connection means 48; this external flange has at least two holes therethrough. At least one of those holes is for passage therethrough of rod means portion 68 of retention means 50; another one of the holes is for passage therethrough of bolt 76. Bolt 76, when passed through one of the holes in external flange portion 72 and tightened in threaded engagement with nut 78 provides in combination with nut 78 means for retaining connection means 48 in tight engagement with channeling means 40. Accordingly, when retention means 50 retains containment means 46 against connection means 48 by nut 70 on partially threaded rod 68 having been tightened against flange portion 72, and when bolt 76 has been passed through flange portion 72 of connection means 48 and flange portion 44 of channeling means 40 and has been tightened in threaded engagement with nut 78, the retention means, the containment means, the connection means and the channeling means are retained tightly together.

The adsorbent material is contained in the containment means by external wall 63 of containment means 46 and by screens or meshes at either end thereof. One screen or mesh 80 is disposed across the passageway through ring-like structure 74 of connection means 48. Screen 80 is retained in connection means 48 by a retaining ring snapped into a circumferential groove around the inside surface of the hole in the ring-like structure of the connection means. Some of these items have not been numbered in FIG. 5 in order to aid the clarity of the drawing. A screen at the other end of containment means 46 serves to retain adsorbent therein. Where the containment means comprises a plurality of interchangeable containment means segments, as in FIG. 5, each segment preferably has a screen associated therewith. Where the containment means comprises only a single structure or only one of a plurality of identical interchangeable segments, a screen, such as shown at outlet end 60 of the containment means in FIG. 5, serves to retain adsorbent material 56 in the containment means.

Figure 8:
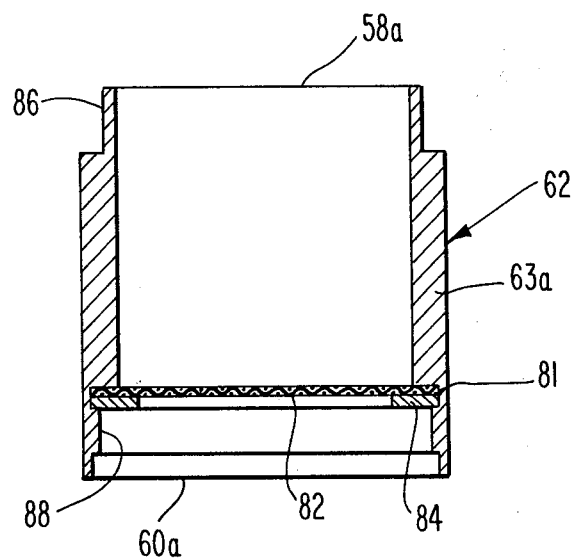
FIG. 8 is a side sectional view of a containment means segment portion of a sample canister, with the section taken as indicated by the lines and arrows 5—5 in FIG. 1.

Reference is now made to FIG. 8. The individual containment means segment shown has inlet end 58a, outlet end 60a and circumferential side wall 63a. Around the surface of the passageway through the containment means segment is circumferential notch 81 in which a screen or mesh means 82 is fitted. The screen or mesh is retained by retaining ring 84 snapped into place. Shoulder 86 fits into notch 88 of another identical containment means segment or into a connection means. Shoulder 86 is preferably at a first or inlet end of the containment means segment and notch 88 is preferably at a second or outlet end of the containment means segment. Mesh means 82 is of a suitably small mesh size so as to retain the sample adsorbent material within the containment means segment.

As noted, in the preferred embodiment of the present invention, the containment means comprises a plurality of interchangeable containment means segments. In this embodiment, the sample canister can be assembled utilizing any number of containment means segments to form the containment means with the number of containment means segments employed being dictated by the minimum thickness of adsorbent in the filter beds 16. When the sample canister is assembled, the shortest path contaminated gas can take through the sample adsorbent material in the containment means is, when considering the sample canister in FIG. 5, a vertical straight line path of length D down through the containment means segments. To make the shortest path for gas travel through the adsorbent material in the sample canister the same or slightly less than the shortest path for gas travel through adsorbent material in the adsorber, the sample canister would be constructed with dimension D in FIG. 5 equal to or slightly less than dimension W in FIG. 2. By way of example and not by way of limitation, if W was 6 inches, the sample canister might be constructed with each containment means segment of length 2 inches or just slightly less than 2 inches. When three containment means segments were used to form the containment means, dimension D in FIG. 5 would be 6 inches or just slightly less and dimensions D and W would substantially be equal. Alternatively, the containment means could be constructed as a single unified structure, having a length of 6 inches or just slightly less. This embodiment has not been illustrated. It is to be understood that the foregoing examples and dimensional figures are given for purposes of illustration only and that the dimensions and parameters noted are not in any way to be construed to limit the scope of the present invention. However, common to all examples and embodiments is the principle of making the shortest path contaminated gas can take through the sample adsorbent contained in the sample canister equal to or less than the shortest path contaminated gas can take through the adsorbent in the filter beds of the adsorber.

Again referring to FIG. 5, the three containment means segments 62 of FIG. 8 have been fitted together to form a single containment means 46. Each containment means segment 62 has a mesh means therein disposed close to the outlet. Accordingly, the four mesh means shown in FIG. 5, one associated with each of the three containment means segments 46 and one associated with connection means 48, form three discrete compartments for sample adsorbent to be exposed to gas flow.

Reference is made to FIG. 6. Again visible are external side walls 63 of the containment means, retention means 50 with ring-like structure 64 and partially threaded rod 68 extending therefrom, external flange 72 of the connection means, external flange 44 of the channeling means, all substantially as in FIG. 5 and numbered correspondingly. First gasket means 90 is disposed between the channeling means and the connection means for affecting a substantially airtight seal therebetween. Second gasket means 92 disposed between the containment means and the connection means affects a substantially airtight seal therebetween. Similarly gasket means 94 are required between adjoining containment means segments so as to affect substantially airtight seals therebetween when a plurality of containment means segments are used to form the containment means.

The gasket means provide assurance that any contaminated gas flowing through the sample canister must pass through the entire sample canister and hence contact a predetermined amount of sample adsorbent. The contaminated gas cannot leak from the sample canister through the junction of the containment means and the connection means, or the junction of the connection means and the channeling means or any junction of two containment means segments. Also clearly shown in FIG. 6 are mesh means 82 and retaining ring means 84 associated with each containment means segment and mesh means 80 and retaining ring means 79 associated with the connection means. The mesh means and the retaining ring means fit into circumferential grooves around the inside of the containment means segments and the connection means; the retaining rings are snapfitted into these circumferential grooves to retain the mesh means.

Although the embodiment of the sample canister shown in FIGS. 5 and 6 illustrates but a single partially threaded rod 68 extending from flange portion 64 of retention means 50 and although FIG. 5 illustrates but a single nut 78 and bolt 76 in combination connecting external flange portion 72 of connection means 48 to external flange portion 44 of channeling means 40, any number of threaded rod and nut combinations and any number of nut and bolt combinations may be used to connect the portions of the sample canister together and the number of such connecting elements is limited only by space available circumferentially around the sample canister. Likewise, although all the sample canisters illustrated have been shown having generally circular cross sections, it is to be understood that the sample canister portion of the present invention is not limited to sample canisters of generally circular cross section. Any of a variety of configurations are possible.

The sample canister preferably should be constructed with channeling means 40 having generally a curved, right angle disposition, with containment means 46 oriented vertically, either substantially straight up or straight down. This is to eliminate undesirable channeling effects which may occur if the containment means is not disposed vertically. Undesirable channeling effects can occur if adsorbent in the containment means portion of the sample canister settles to one side as shown in FIG. 7. In FIG. 7 void 96 is a passageway through which gas could flow without substantially contacting adsorbent 56. If the adsorbent in the sample canister illustrated in FIG. 7 were removed and tested to determine the efficacy of the adsorbent in the adsorber filter, the test results would be erroneous because the sample adsorbent would not have been exposed to the same gas flow conditions as experienced by adsorbent in the adsorber. If the containment means is always oriented vertically, undesirable channeling cannot occur and all gas passing through the containment means will pass through the adsorbent therein. Accordingly, test results will be valid.

Figure 4:
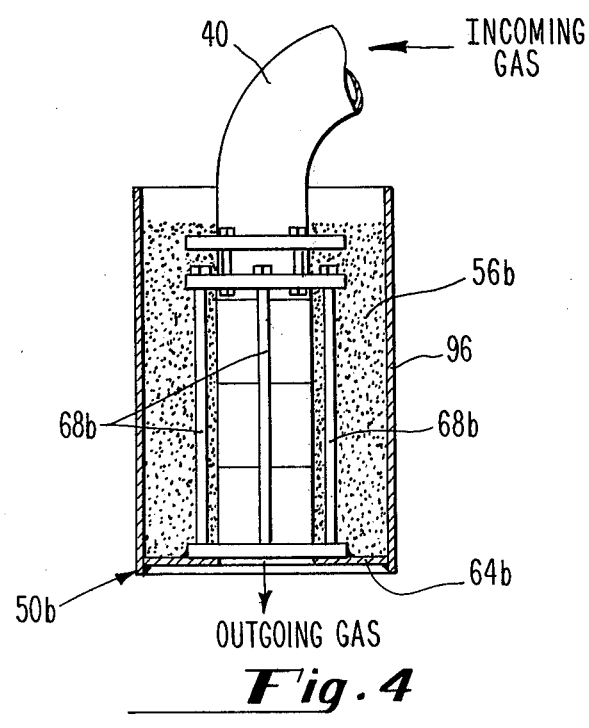
FIG. 4 is a partially sectioned side view of a second embodiment of the sample canister portion of the present invention wherein there is provided a safety basket for the containment of additional adsorbent around the sample canister portion of the present invention.

Reference is now made to FIG. 4 where an alternative embodiment of means for retaining the containment means against the connection means is shown. In this embodiment of the sample canister, ring-like structure 65b of the retention means has a larger diameter than in the preferred embodiment shown in FIG. 5, so that it extends further radially outward from the axis of symmetry of the containment means. Wall structure 96 extends perpendicularly from ring-like structure 64b, in the same direction as partially threaded rod 68b, a sufficient length to form a safety basket to surround the containment means, the connection means, and at least a portion of the channeling means. The wall structure or safety basket is filled with adsorbent 56b. This embodiment of the retention means not only serves to retain the containment means against the connection means but also provides an additional safety feature in that should any gas leak at the juncture of the channeling means and the connection means or at the juncture of the connection means and the containment means or from between any of the containment means segments, such gas would have to pass through the additional adsorbent 56b contained by the wall structure or safety basket 96. Thus, additional purification of this gas would take place thereby providing an even greater margin of safety. When the retention means is configured forming the safety basket shown in FIG. 4, it would be constructed such that it could hold sufficient adsorbent 56b whereby the minimum distance leaking gas would have to travel through adsorbent material 56b contained by the safety basket is at least equal to the shortest path contaminated gas must travel through adsorbent material in the adsorber.

In the embodiment shown in FIG. 4, retention means 50b has been illustrated with the three connecting rod means 68b at least partially threaded and in engagement with the connection means. At least two nut and bolt combinations connect the external flange portion of the connection means with the external flange portion of the channeling means. Some structural elements of the sample canister shown in FIG. 4 have not been numbered, where the elements are substantially the same as corresponding elements shown in the embodiments discussed previously, to aid the clarity of the drawing.

Figure 3:
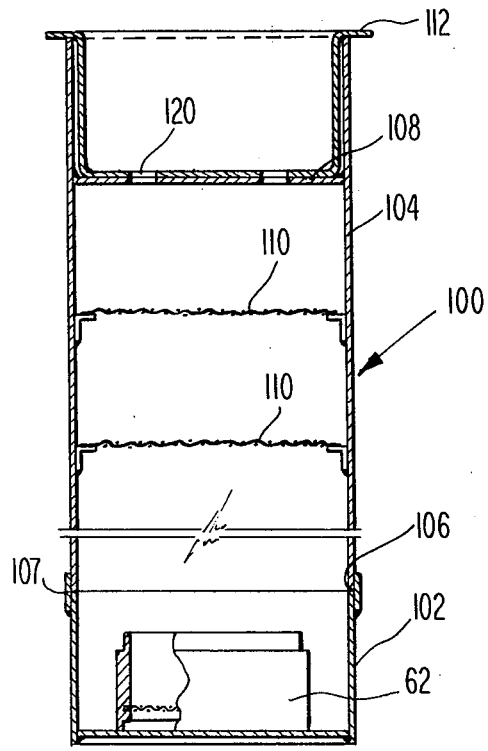
FIG. 3 is a side sectional broken view of a portion of the apparatus of the present invention comprising means for filling a sample canister with sample adsorbent, with a portion of a sample canister shown contained therein.

Reference is now made to FIG. 3 showing in a broken sectional view a means 100 for filling the containment means or a containment means segment with sample adsorbent material. This means 100 for filling the containment means or a containment means segment with sample adsorbent comprises lower portion 102 and upper portion 104. These two portions are adapted for optional connection and separation at juncture 106. Lower portion 102 is a means for at least partially surrounding a containment means while the containment means is being filled with sample granular adsorbent. Upper portion 104 is a means for metering and distributing a flow of granular adsorbent when granular adsorbent is being filled into a containment means contained in lower portion 102 to which upper portion 104 is attached. An interference fit between the upper portion and the lower portion with flange member 107 being attached to either the upper or the lower portion for force fitting with the remaining portion is preferred. Upper portion 104 has therein metering means 108 in the form of a plate having at least one hole for passage of adsorbent therethrough. Rotatable valve 112 fits slidably into a vertical extremity of upper portion 104 for rotational movement therewithin. Valve 112 has the same number of holes 120 as metering means 108 and the holes in each of these two members are the same size and oriented in the same manner. When valve 112 is turned to a first position, holes 120 in valve 112 are congruent with those of metering means 108 and adsorbent can pass through the holes into a containment means segment in lower portion 102. When valve 112 is turned to a second position, holes 120 are no longer congruent with those of metering means 108, but are blocked and no adsorbent can flow downward. Upper portion 104 also has at least one mesh distribution means 110 for distributing sample adsorbent in a substantially uniform fashion. The mesh distribution means 110 are disposed below metering means 108. By placing adsorbent on rotatable valve 112 while it is in the first or open position, thereby allowing the adsorbent to fall through one or more of the mesh distribution means into a containment means or a containment means segment 62 such as is shown in position for filling in FIG. 3, a substantially uniformally packed density of adsorbent in the containment means or containment means segment results. This is required so that gas flowing through the sample canister, when it is assembled, is exposed to substantially uniform flow conditions, no matter which portion of the containment means the gas flows through. The size of lower portion 102 will be dictated by the size of the containment means to be filled. The size of the holes in valve means 112, and in plate or metering means 108 and the mesh size of mesh distribution means 110 will be dictated by the size of the granules or particles of the adsorbent which is being packed into the sample canister. It is to be understood that the mesh or hole size of the mesh distribution means 110 will always be sufficiently large to allow the passage therethrough of granular adsorbent material, the mesh size being such as to affect uniform distribution of adsorbent flow through the mesh distribution means, across the area thereof. Contrasting, the mesh means 82 portion of the containment means and the mesh 80 portion of the connection means are of sufficiently small mesh size that no adsorbent can pass therethrough.

Reference is now made to FIG. 9 showing the channeling means 40 of the sample canister with cover means 120 attached thereto for closing the channeling means so that no gas can pass through. Cover means are utilized after sample adsorbent has been removed with the containment means. The cover means 120 preferably consists of a solid center structure portion 122 adapted for tight contact with outlet 54 of channeling means 40. Skirt portion 124 extends outward radially from at least a portion of solid center structure portion 122 and preferably has one or more at least partially threaded rods 126 extending therefrom, for passing through one or more holes in external flange portion 44 of channeling means 40. Third nuts 128 are provided for engagement with threaded portions of rods 126 which extend from cover means 120. When third nuts 128 are tightly threadedly engaged with threaded portions of rod means 126, cover means 120 is tightly retained against the outer end of channel means 40 and no gas can escape. Optionally, gasket means 130 may be provided so as to provide even greater assurance of an airtight seal between cover means 120 and the outlet end of channeling means 40.

Figure 10:
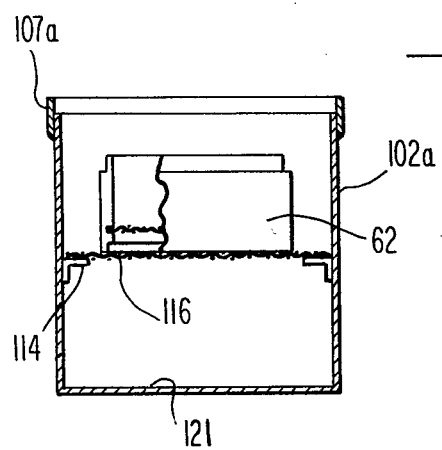
FIG. 10 is a side sectional broken view of a portion of a second embodiment of a bottom portion of a means for filling a portion of a sample canister with sample adsorbent, with a portion of a sample canister shown therein.

Reference is now made to FIG. 10 wherein there is shown a second embodiment of a bottom portion of means for filling a containment means or a containment means segment with adsorbent material. This bottom portion designated generally 102a is similar to that shown in FIG. 3, but has screen support portion 116, supported by bracket means 114, for supporting the containment means or a containment means segment 62 above base 121 of bottom portion 102a. Flange members 107a are provided so that bottom portion 102a may be force fitted together with an upper portion such as upper portion 104 shown in FIG. 3. The embodiment shown in FIG. 10 for bottom portion 102a allows the containment means segment to be filled with granular adsorbent while the top portion of the containment means segment is maintained substantially above the level of excess granular adsorbent which cannot enter the containment means segment once it has been filled. This facilitates handling of the filled containment means segment without disturbing the granular adsorbent material packed therein. It is to be understood that lower portion 102a shown in FIG. 10 fits with upper portion 104 shown in FIG. 3 and may be used for filling either a single containment means segment or a large containment means. Screen support portion 116 has a sufficiently large mesh size such that granular adsorbent which does not enter the containment means resting thereon passes through the screen means and accumulates on base 121. No adsorbent accumulates on screen support means 116.

The sample canister position of the present invention may be provided in kit form with, for example, channel means, connection means, retention means, means for filling a containment means with adsorbent, cover means, and one or more containment means or containment means segments. This kit form allows the user to utilize any desired number of containment means segments to provide a thickness of adsorbent material for gas passage therethrough which is the same as the thickness of the filter bed whose filtering efficacy is to be monitored. In such case, the purchaser of the sample canister can assemble the sample canister kit and include as many containment means segments as desired, and can fill each segment with granular adsorbent.

Reference is now made to FIGS. 11, 12, 13, 14 and 15A through 15E. In FIG. 11 there is shown a top view of a second embodiment of the gas purifier of the present invention. The adsorber portion of the gas purifier is designated generally by bracket 10a and the sample canisters 12 are shown with one mounted on outlet blocking plate 26a and two more sample canisters mounted on either side of housing 14a. Spaced parallel vertically oriented adsorbent filter beds are denoted 16a. With the exception of structure at the bottom of the filter beds, described below, the adsorber portion of this embodiment of the invention is substantially similar to the adsorber portion in the embodiment of the invention illustrated in FIG. 1 and described above.

FIG. 12 illustrates the structure, at the bottom of adsorbent filter beds 16a, which facilitates emptying of adsorbent material from the filter beds. This structure is disclosed and claimed in referenced U.S. Pat. No. 3,964,890. The structure at the bottom of the filter beds comprises two longitudinal walls 100 and 102 disposed in a pair. The walls extend from outer bottom edges of at least one filter bed along the entire longitudinal length thereof. The walls initially converge towards each other, preferably along a straight line inclined from the horizontal at an angle F. This angle preferably is any angle in excess of the angle of repose of the adsorbent contained in the filter beds. The walls, as they converge to an area of minimum distance therebetween form throat 104 and then diverge thereby forming discharge chute 106. Channel means 108 extend laterally exterior of said walls, preferably laterally exterior of said discharge chute, along the entire longitudinal length of the walls, preferably proximate the portion of said discharge chute close to throat 104. Well 100 is connected to channel means 108 and extends the longitudinal length of the discharge chute thereby surrounding the discharge chute. Converging portions of walls 100 and 102 form a trough below beds 16a. When beds 16a are filled with adsorbent, the adsorbent is substantially supported by the converging portions of walls 100 and 102 but a portion of adsorbent passes through the throat and discharge chute and forms a heap on the bottom of said well below the discharge chute along the entire longitudinal length thereof. This heap is formed until the angle of repose of adsorbent in the well closes the space between the discharge chute and the well along their entire longitudinal length. Formation of the heap with consequent closure of the discharge chute is illustrated in more detail in FIG. 14.

Reference is made now to FIG. 13 showing a partially sectioned side view of the bottom portion shown in FIG. 12. End plates 24a and 26a extend below the horizontal bottom extremity of perforate wall 19a, denoted by horizontal line E, so as to form end plate means for containing adsorbent at the ends of walls 100 and 102 which extend from bottom edges of filter beds. A pipe 112 extends from one end of well 110. Discharge chute 106 is of greater length at the end of the well where pipe 112 is located and of lesser length at the opposite end of the well; discharge chute 106 preferably tapers in length preferably evenly therebetween as shown in FIG. 13. Hole means 114 are provided in the well on either side thereof at the extreme end opposite pipe 112 for inlet of air when it is desired to empty the filter bed or beds of adsorbent. Removeable plugs are provided for closure of holes 114. This structure at the bottom of filter beds 16a as described and shown in FIGS. 12, 13 and 14 provides means for emptying filter beds of adsorbent when the removeable plugs are removed from holes 114 and suction is applied to pipe 112. Once the adsorbent has been removed and suction is no longer applied, the plugs are replaced in the holes 114.

The sequence of removal of adsorbent from the filter bed is illustrated in FIGS. 15A through 15E. It is seen therein that when a suction inlet of blower 116 is connected to pipe 112, adsorbent in well 110 which has closed discharge chute 106 will be pneumatically swept along the longitudinal length of well 110 and pneumatically removed therefrom. Due to the taper of the discharge chute, adsorbent in well 110 most remote from pipe 112 is removed first. Adsorbent in a filter bed corner most remote from pipe 112 falls vertically through discharge chute 106 and then is removed from well 110 be suction of blower 116. As blower 116 continues to apply suction, adsorbent in beds above walls 100 and 102 will progressively fall through discharge chute 106 and progressively replace adsorbent which has been drawn from well 110 until all adsorbent has been removed from the filter bed or beds above walls 100 and 102. Adsorbent is emptied first from the corner of the hexahedron shaped bed most remote from pipe 112 while adsorbent in the corner of the hexahedron shaped bed diagonally opposite the remote corner and most proximate pipe 112 is removed last. In FIGS. 15A through 15E, removal of the adsorbent has been illustrated only schematically without showing details of the structure shown in FIGS. 12 through 14, in order to aid the clarity of the drawing.

The structure shown in FIGS. 12 through 14 which facilitates emptying of the filter beds has been shown with two adjacent filter beds 16a disposed above walls 100 and 102, with walls 100 and 102 extending initially inwardly towards each other from respective outer edges of the adjacent filter beds. It is to be understood that a pair of walls like walls 100 and 102 could be provided below each individual filter bed with the walls extending initially inwardly towards each other from the edges of two perforate walls of the single filter bed immediately thereabove. Likewise, a pair of walls like walls 100 and 102 could be provided below a plurality of filter beds, so long as the converging portions of the walls converge at an angle from the horizontal greater than the angle of repose of the adsorbent and the two walls extend towards each other from the outer bottom edges of the two most exterior of the plurality of filter beds. All of these embodiments, when a throat, discharge chute, well, pipe and blower substantially as shown in FIGS. 12 through 15E, are provided, will facilitate complete emptying of the filter bed or beds above the pair of walls, in the manner illustrated in FIGS. 15A through 15E.

In the most preferred embodiment of the sample canister portion of the present invention, the inside diameter of the channel means, the inside diameter of the ring-like portion of the connection means, the inside diameter of the containment means or the containment means segments and the diameter of the large hole in the retention means are all substantially the same so that gas flow through these elements is at substantially constant velocity. Likewise in the preferred embodiment, each of these elements is of generally circular shape and the passages therethrough for travel of gas are generally circular. It is to be noted that the connecting rods, bolts and nuts shown are merely illustrative and that any configuration of threaded rods, nuts and bolts could be used or any other fastening means could be used to secure together the component parts of the sample canister.

Any suitable particulate material which adsorbs radioactive contaminants, including radioactive isotopes of iodine, may be used as the adsorbent in the gas purifier. Such materials include, for example, activated carbon. The carbon adsorbent may be made from coal, coconut shell, petroleum, wood or any other suitable base; coal is the preferred base. The activated carbon adsorbent may be impregnated with potassium iodide, elemental iodine, triethylene diamine, lead or other metals with potassium iodide being the preferred impregnate. Also, silver zeolite, and other adsorbing metals and metal compounds may be used as adsorbents. These metals may be impregnated with silver or other metallic cations when used as adsorbents in the gas purifier of the present invention. All these adsorbents have an angle of repose of approximately 35°.

As noted above, in order for tests to determine the filtering efficacy of the adsorbent to be meaningful, the sample adsorbent material must be exposed to the same gas flow conditions as the adsorbent material in the adsorber. The gas purifier of the present invention meets this goal. Particularly, since flow conductance is a function both of granular adsorbent material packing density and of flow distance through the adsorbent material, these two parameters must both be controlled so that they are substantially the same in the sample canister and the filter beds.

The means for filling the containment means or a containment means segment with sample adsorbent material shown in FIG. 3 and in FIG. 10 when utilized produces a packing density of the sample adsorbent material in the containment means which is uniform and repeatable on successive trails. Furthermore, use of this means for filling the sample canister containment means segments with adsorbent results in a packing density substantially the same as the packing density in the adsorber when the adsorber filter beds are filled with adsorbent material using the apparatus described and claimed in U.S. Pat. No. 4,030,639. Charcoal Adsorber Filter Fill System. Accordingly, one of the two parameters for obtaining equal flow conductance through the sample canister and the filter beds of the adsorber has been shown to be controllable and repeatable. Thus, so long as the distance gas travels through adsorbent in the adsorber filter beds and through the sample canister is equal, flow conductance will be the same through the adsorber and through the sample canister. Clearly these distances can be controlled by design as described above with reference to FIG. 2 and FIG. 5. Specifically, in the embodiment shown in FIG. 2 and FIG. 5, if dimension D is the same as dimension W, the minimum gas flow distance through adsorbent material will be the same in the sample canister and in the adsorber bed.

The containment means containing adsorbent material is constructed with dimensions such that the minimum gas flow distance therethrough is slightly shorter than the minimum gas flow distance through an adsorber filter bed. Hence adsorbent material in a sample canister receives a slightly greater flow of gas than does adsorbent material in an adsorber filter bed and the sample adsorbent material in the sample canister "sees" slightly worse flow conditions than does adsorbent material in the adsorber filter beds. Therefore the sample adsorbent loses its adsorbing efficacy slightly faster than does the adsorbent material in the adsorber filter beds. Thus, when a test of sample canister adsorbent material indicates that its adsorbing efficacy is nearly depleted, there is assurance that adsorbent material in the adsorber filter beds has somewhat more adsorbing efficacy remaining. This means "worst case" conditions are always experienced by adsorbent material in the sample canister and a margin of safety is provided for the adsorbent in the adsorber filter beds.

The adsorber filter system has been constructed with the filter bed having a width W in FIG. 2 of 2 and $\frac{1}{8}$ inches. The sample canister designed for use with this bed has a containment means of length 2 inches with machine tolerances of $-$ 0.00 inches $+$ 0.05 inches. Thus the containment means has a slightly shorter minimum distance for gas flow therethrough (dimension D in FIG. 5) than the minimum distance for gas flow through the adsorber filter bed (dimension W in FIG. 2).

Figure 16:
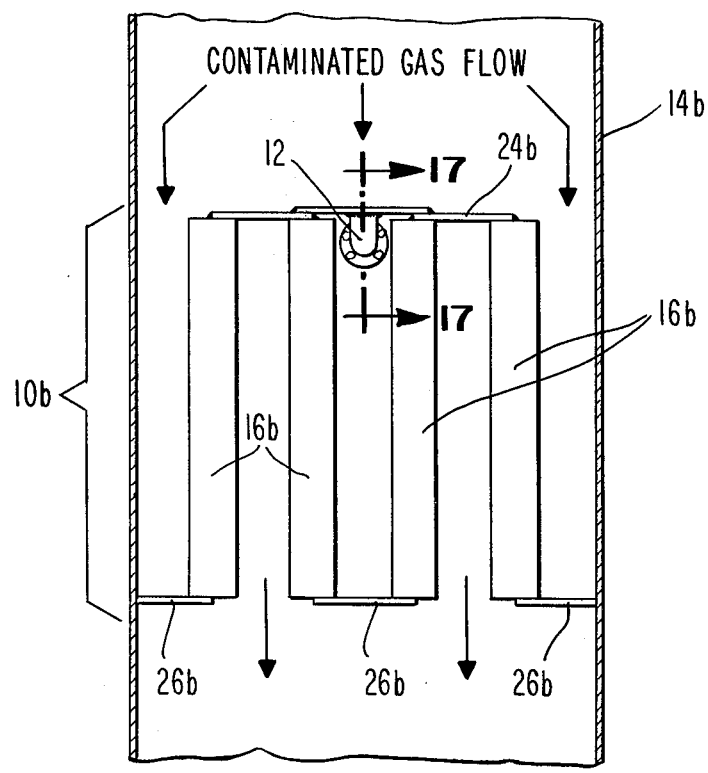
FIG. 16 is a top view of a third embodiment of the gas purifier of the present invention, showing a sample canister mounted on the adsorber in an upstream position.
Figure 17:
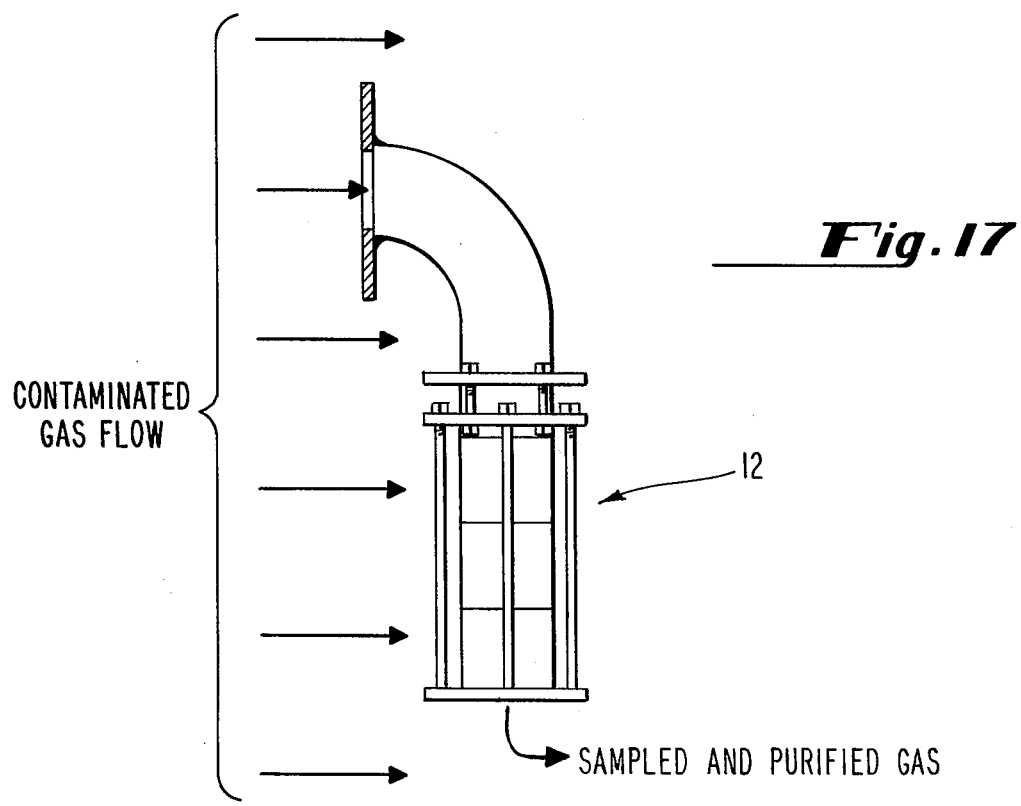
FIG. 17 is a sectional view of the sample canister illustrated in FIG. 16, taken along the lines and arrows indicated 17—17 in FIG. 16.

It is to be understood that so long as the static pressure drop experienced by gas passing through the containment means of the sample canister is substantially the same as the static pressure drop experienced by gas passing through an adsorber bed, the sample canister portion of the gas purifier of the present invention can be mounted anywhere on or in connection with the adsorber filter portion of the present invention, so long as the sample canister is not disposed for passage therethrough of gas which has already passed through the filter beds of the adsorber. Thus, with reference to FIGS. 1 and 11, the sample canister could be mounted on the outside of duct 14 as shown in FIG. 11, or even upstream of the filter beds, attached to inlet blocking plates 24a as shown in FIGS. 16 and 17. The preferred attachment orientation and position is that shown in FIG. 1, however, it is to be understood that any suitable attachment position and sample canister orientation may be used so long as the sample canister is exposed to the proper contaminated gas flow and is disposed such that the static pressure drop across the canister is at least as great as the static pressure drop across one adsorber filter bed.

The invention being thus described, we claim the following:

1. Sample canister apparatus, for use with an associated adsorber filter having a plurality of vertically oriented vertically rechargeable filter assemblies for containing granular adsorbent material for horizontal gas flow therethrough, for containing sample adsorbent material of the same type as contained in said filter assemblies and for exposing any said sample adsorbent material contained therein to gas flow for single-stage filtering of said gas, a portion of said sample canister apparatus being removable from said associated adsorber filter without disturbing structural integrity of said adsorber filter and without disturbing any adsorbent material in said adsorber filter, comprising:

(a) an imperforate conduit having inlet and outlet ends with a right-angle bend therebetween, said inlet inlet end connected in fluid-tight relation to said associated adsorber filter to receive horizontally flowing gas therefrom which gas has yet to pass through said filter assemblies; and (b) a generally vertically oriented imperforate straight tube, of length at most equal to the minimum distance for horizontal gas flow through granular adsorbent material in one of said filter assemblies in said associated absorber filter, having inlet and outlet ends, said tube inlet end removably connected in fluid-tight relation to said conduit outlet end to receive vertically flowing gas therefrom, for containing sample granular adsorbent material for exposure thereof to any gas received from said conduit as any said gas flows vertically through said tube, said tube including perforate means at said outlet end thereof for retaining a free-standing column of sample adsorbent material within said tube by preventing vertically downward flow of any column of sample adsorbent material contained therewithin; and (c) sample granular adsorbent material, of the same type as said adsorbent material contained within said filter assemblies, disposed as a free-standing uncompressed column occupying the entirety of said imperforate straight tube interior volume.

2. The apparatus of claim 1 wherein said straight tube further comprises a plurality of tubular segments, a first tubular segment of said plurality connected to said conduit and each remaining tubular segment connected to a preceeding tubular segment such that said plurality of tubular segments are connected together seriatim, each segment including perforate means for retaining a free-standing column of sample adsorbent material within said segment by preventing vertically downward flow of any column of sample adsorbent material contained therewithin.

3. The apparatus of claim 2 wherein said tubular segments are identical and interchangeable.

4. The apparatus of claim 2 wherein said perforate retention means is a rigid planar mesh located at a lower end of said segment across the entire cross-section thereof and secured to the tubular wall of said segment.

5. The apparatus of claim 1 further comprising a cover adapted to be removably connected in fluid-tight relation to said conduit outlet end in the absence of said straight tube, for closing said conduit.

6. The apparatus of claim 5 further comprising a cylindrical basket of diameter larger than said straight tube, in surrounding concentric disposition with said straight tube and rigidly connected thereto such that the lower end of said straight tube and the lower end of said cylindrical basket are coplanar, for retaining therewithin any adsorbent material surrounding said straight tube.

7. A test kit facilitating periodic testing of sample adsorbent material representative of adsorbent material in an associated adsorber filter system, said kit having a straight tube capable of being filled with adsorbent material, a first portion of said kit, including said straight tube, capable of being assembled and connected to an associated adsorber filter system at a position to expose sample adsorbent material contained in said tube to gas flow conditions experienced by adsorbent material in said adsorber filter system, said straight tube portion of said kit being removable from said associated adsorber filter system to facilitate testing of sample adsorbent material contained therein representative of adsorbent material in said adsorber filter system, without affecting filtering efficacy or structural integrity of said adsorber filter system, said kit comprising:

(a) an imperforate conduit having inlet and outlet ends with a right-angle bend therebetween, said inlet end adapted to be connected to said adsorber filter system at a position to receive gas therefrom before gas passes through granular adsorbent in said adsorber filter system;

(b) an imperforate straight tube, of length at most equal to a minimum distance for gas flow through granular adsorbent in said associated adsorber system, having inlet and outlet ends, said inlet end adapted to be removably connected in fluid-tight relation to said conduit outlet to receive vertically flowing gas therefrom, for containing a free-standing column of sample adsorbent material for exposure thereof to gas received from said conduit as said gas flows vertically through said tube, said tube including perforate means at said outlet end thereof for retaining any said free-standing column of sample adsorbent material within said tube by preventing vertically downward flow of any said column of sample adsorbent material contained therewithin;

(c) an imperforate cover adapted to be removably connected in fluid-tight relation to said conduit outlet end in the absence of said tube, for closing said conduit;

(d) tubular means for filling said straight tube with a free-standing column of sample adsorbent material, adapted to concentrically surround said straight tube, by channelling any downward flow of sample adsorbent material into said straight tube when said kit is disassembled and said straight tube is positioned within said tubular means, said tubular filling means being capable of disassembly and further comprising the combination of:

(1) a lower tubular portion for concentrically surrounding said straight tube while said straight tube is being filled with sample adsorbent material, adapted to be removably force-fitted to an upper tubular portion of said tubular filling means;

(2) an upper tubular portion of metering and distributing flow of sample adsorbent material into said straight tube while said straight tube is contained in said lower tubular portion, said upper tubular portion adapted to be removably force-fitted to said lower tubular portion, said upper tubular portion further comprising:

i. a metering plate contained within said upper tubular portion and perpendicular to the tubular wall thereof, extending across the hollow cross-section of said upper tubular portion and having a hole therein for flow of sample adsorbent material therethrough; and ii. a rigid distribution mesh substantially parallel to and the same area as said metering plate and rigidly secured to the tubular wall of said upper tubular portion, for distributing a downward flow of sample adsorbent material after said sample adsorbent material has passed through said metering plate;

wherein said distribution mesh is remote from and below said metering plate such that when said upper and lower tubular portions are force-fitted together in an assembled condition and said straight tube is positioned within said lower portion, any sample adsorbent material poured into said tubular filling means first passes through said metering plate and then through said distribution mesh of said upper tubular portion and then flows into said lower tubular portion and said straight tube contained therein; wherein said kit is capable of being assembled with said conduit and said straight tube connected seriatim for gas flow therethrough and is also capable of being assembled alternately with said cover connected to said conduit in fluid-tight relation so no gas can pass therethrough.

8. The kit of claim 7, wherein said metering plate has a plurality of holes therethrough symmetrically distributed over said metering plate, and wherein said upper tubular portion further comprises a plurality of rigid planar distribution meshes, each mesh substantially parallel to and the same area as said metering plate and rigidly secured to the tubular wall of said upper tubular portion, each mesh disposed remote from and below said metering plate and remote from all remaining meshes of said plurality.

9. Apparatus for use in filtering as a gas purifier, adapted to contain adsorbent material for adsorption of radioactive contamination from a gas stream passing therethrough, including a rechargeable gas adsorber assembly for containing adsorbent material and including apparatus for containing sample adsorbent material, wherein any sample adsorbent material contained in said sample containment apparatus is exposed to contaminated gas flow at least as great as contaminated gas flow through any adsorbent material contained in said adsorber assembly, comprising in combination:
 (a) a gas adsorber assembly for containing absorbent material, comprising:
  (1) A housing having a contaminated gas inlet and a filtered gas outlet and including inlet port means for passage therethrough of granular adsorbent material into filter assemblies within said housing;
  (2) a plurality of vertically oriented vertically rechargeable parallelepiped-shaped filter assemblies within said housing, each filter assembly including two horizontally spaced-apart parallel vertical perforate walls, having horizontally extending lower margins, and two horizontally spaced-apart parallel vertical solid walls, said vertical perforate and solid walls connected along their vertically extending edges to form four vertical surfaces of said filter assembly; each said filter assembly being disposed for containment of vertically charged free-standing uncompressed adsorbent material in said parallelepiped defined by said two parallel perforate walls and said two parallel solid walls, for horizontal flow of gas therethrough, through said two perforate walls, said filter assemblies being generally parallel with one another and separated from one another and from said housing by spaces for gas flow;
  (3) baffle means, rigidly connecting said filter assemblies together, in parallel spaced disposition one from another, and to said housing, for directing gas flow within said housing so some gas entering said inlet, before exiting said housing through said filtered gas outlet, passes horizontally through said vertical perforate walls of one of said filter assemblies prior to such exit and remaining gas entering said inlet before exiting said housing passes through apparatus for containing sample adsorbent, said baffle means including:
   (i) vertically upstanding imperforate inlet blocking plates extending the vertical height of said solid walls of said filter assemblies, positioned alternately between adjacent filter assemblies and between end assemblies of said plurality and said housing, secured along vertically extending margins thereof to said vertically extending solid walls of said adjacent filter assemblies and to said housing, proximate said gas inlet;
   (ii) vertically upstanding imperforate outlet blocking plates, extending the vertical height of said solid walls of said filter assemblies, positioned alternately between adjacent filter assemblies, secured along vertically extending margins thereof to said adjacent filter assemblies proximate said filtered gas outlet; said outlet blocking plates closing alternate spaces between adjacent filter assemblies and between end filter assemblies and said housing which lack an outboard blocking plate and hence are open at said filtered gas outlet;
  (4) imperforate top cover plates horizontally extending from vertical extremities of said inlet and outlet blocking plates the length of said filter assemblies between adjacent assemblies of said plurality and between end filter assemblies of said plurality and said housing, secured to said vertical perforate walls of said filter assemblies along upper horizontally extending margins thereof, for preventing granular adsorbent material entering said housing through said inlet port from occupying space between adjacent filter assemblies or between end filter assemblies and said housing;
   (iii) imperforate bottom plates horizontally extending from lower extremities of said inlet and outlet blocking plates the length of said filter assemblies, between adjacent filter assemblies of said plurality and between end filter assemblies of said plurality and said housing, secured to said vertical perforate walls of said filter assemblies along lower horizontally extending margins thereof, for preventing granular adsorbent material from entering space between end filter beds and said housing, from below said filter beds; (b) apparatus for containing sample adsorbent, comprising:
 (1) an imperforate conduit having inlet and outlet ends with a right-angle bend therebetween, said inlet end connected in fluid-tight relation to communicate with an orifice in an imperforate outlet blocking plate portion of said baffle means of said gas adsorber assembly to receive gas from within said adsorber assembly, before said gas passes through any of said filter assemblies; and
 (2) a generally vertically oriented imperforate straight tube, of length at most equal to the distance by which said parallel vertical perforate walls of one of said filter assemblies are spaced apart, having inlet and outlet ends, said tube inlet end removably connected in fluid-tight relation to said conduit outlet end to receive vertically flowing gas therefrom, said tube outlet end positioned to exhaust any gas passing through said tube to a position downstream of said filter assemblies, for containing a free-standing uncompressed column of sample adsorbent material for exposure thereof to any gas received from within sid adsorber as any said gas flows vertically through said tube, said tube including a mesh at said outlet end thereof for retaining sample adsorbent material within said tube by preventing vertically downward flow of any free-standing uncompressed sample adsorbent material contained within said tube.

10. The apparatus of claim 9 wherein each said rechargeable filter assembly further comprises:
(a) a pair of solid bottom walls, each solid bottom wall of said pair extending downwardly from a horizontal bottom edge of one of said vertical perforate walls entirely along the horizontal length thereof, said solid bottom walls initially converging and then diverging below said filter assembly, said converging portions thereby forming a trough below said filter assembly along the length thereof, said diverging portions forming a downwardly diverging discharge chute extending horizontally the length of said filter assembly, said discharge chute being of greater length at one end of said filter assembly, of lesser length at an opposite end and tapering uniformly therebetween;
(b) a channel laterally extending exterior said discharge chute along said horizontal length thereof;
(c) a well, connected to said channel, extending horizontally said length of said discharge chute thereby surrounding said discharge chute; and
(d) a pipe extending horizontally from the end of said well where said discharge chute is of greater length; whereby when said filter assembly is filled with adsorbent material, a portion of said adsorbent material will fall through said discharge chute and form a heap in a portion of said well below said discharge chute along said horizontal length thereof until said heap of adsorbent material closes said discharge chute along said entire horizontal length thereof; and wherein said straight tube further comprises:
(e) a plurality of interchangeable tubular segments, each segment including means for retaining sample adsorbent material within said segment by preventing vertically downward flow of any said sample adsorbent material contained therewithin; wherein a first tubular segment of said plurality is connected to said conduit and remaining tubular segments are connected to preceeding tubular segments such that said plurality of tubular segments are connected together seriatim.

11. The apparatus of claim 9 wherein said gas adsorber assembly further comprises:
(a) a pair of solid bottom walls, said pair disposed below at least two filter assemblies, each solid bottom wall of said pair extending downwardly from an outer horizontal bottom edge of a vertical perforate wall of an exterior filter assembly entirely along the longitudinal length thereof, said solid bottom walls of said pair initially converging below said filter assemblies along a straight line inclined from the horizontal, forming a throat and then diverging, said converging portions thereby forming a funnel-like trough below said filter assemblies along said length thereof, said throat portion extending said length of said filter assemblies, said diverging portions forming a downwardly diverging discharge chute extending horizontally the length of said filter assemblies, said discharge chute being of greater length at one end of said filter assemblies, of lesser length at an opposite end and tapering uniformly therebetween;
(b) a channel laterally extending exterior said discharge chute along said horizontal length thereof;
(c) a well, connected to said channel, extending horizontally said length of said discharge chute thereby surrounding said discharge chute; and
(d) a pipe extending horizontally from the end of said well where said discharge chute is of greater length; whereby when said filter assemblies above said pair of walls are filled with adsorbent material, adsorbent material will completely fill said trough, fall through said discharge chute and form a heap in said well below said discharge chute along said horizontal length thereof until said heap of adsorbent material closes said discharge chute along said entire horizontal length thereof; and wherein said straight tube further comprises:
(e) a plurality of interchangeable tubular segments, each segment including means for retaining sample adsorbent material within said segment by preventing vertically downward flow of any said sample adsorbent material contained therewithin; wherein a first tubular segment of said plurality is connected to said conduit and remaining tubular segments are connected to preceeding tubular segments such that said plurality of tubular segments are connected together seriatim.

12. The apparatus of claim 9 wherein said two horizontally spaced parallel vertical walls of each said filter assembly are spaced apart a distance greater than the length of said straight tube.

13. The apparatus of claim 12 wherein said parallelepiped-shaped filter assemblies are right parallelepiped-shaped filter assemblies.

14. A gas purifier for adsorption of radioactive contamination from a gas stream passing therethrough, having a rechargeable gas adsorber assembly and a sample canister, wherein granular sample adsorbent material contained in said sample canister is exposed to contaminated gas flow at least as great as any contaminated gas flow through granular adsorbent material in said adsorber assembly, comprising in combination:
(a) a gas adsorber assembly comprising:
(1) a housing having a contaminated gas inlet and a filtered gas outlet;
(2) a plurality of vertically oriented vertically rechargeable parallelepiped-shaped filter assemblies within said housing, each filter assembly including two horizontally spaced-apart parallel vertical perforate walls having horizontally extending lower margins and two horizontally spaced-apart parallel vertical solid walls, said vertical perforate and solid walls rigidly connected along their vertically extending edges to form four vertical surfaces of said filter assembly, each said filter assembly disposed for containment of vertically charged free-standing uncompressed granular adsorbent material in said parallelepiped defined by said two parallel perforate walls and said two parallel solid walls, for horizontal flow of gas therethrough, through said two perforate walls, said filter assemblies being generally parallel with one another and separated from one another and from said housing by spaces for gas flow;

(3) free-standing uncompressed granular particulate adsorbent material occupying the entire volume of each said parallelepiped-shaped filter assembly; and (4) baffle means rigidly connecting said filter assemblies in parallel spaced disposition one from another and to said housing, for directing gas flow within said housing so gas entering said inlet before exiting said housing through said filtered gas outlet passes horizontally through one of said filter assemblies by passing through said two perforate walls thereof prior to such exit, said baffle means including:

(i) vertically upstanding imperforate inlet blocking plates extending the vertical height of said solid walls of said filter assemblies, positioned alternately between adjacent filter assemblies and between end assemblies of said plurality and said housing, secured along vertically extending margins thereof to said vertically extending solid walls of said adjacent filter assemblies and to said housing, proximate said gas inlet;

(ii) vertically upstanding imperforate outlet blocking plates, extending the vertical height of said solid walls of said filter assemblies, positioned alternately between adjacent filter assemblies, secured along vertically extending margins thereof to said adjacent filter assemblies proximate said filtered gas outlet; said outlet blocking plates closing alternate spaces between adjacent filter assemblies which lack an inlet blocking plate and hence are open at said contaminated gas inlet, said inlet blocking plates closing alternate spaces between adjacent filter assemblies and between end filter assemblies and said housing which lack an outboard blocking plate and hence are open at said filtered gas outlet;

(iii) imperforate top cover plates horizontally extending from vertical extremities of said inlet and outlet blocking plates the length of said filter assemblies between adjacent assemblies of said plurality and between end filter assemblies of said plurality and said housing, secured to said vertical perforate walls of said filter assemblies along upper horizontally extending margins thereof, for preventing granular adsorbent material entering said housing through said inlet port from occupying space between adjacent filter assemblies or between end filter assemblies and said housing;

(iv) imperforate bottom plates horizontally extending from lower extremities of said inlet and outlet blocking plates the length of said filter assemblies, between adjacent filter assemblies of said plurality and between end filter assemblies of said plurality and said housing, secured to said vertical perforate walls of said filter assemblies along lower horizontally extending margins thereof, for preventing granular adsorbent material from entering space between adjacent filter beds and between end filter beds and said housing, from below said filter beds;

(b) a sample canister comprising:

(1) an imperforate conduit having inlet and outlet ends with a right-angle bend therebetween, said inlet end connected in fluid-tight relation to communicate with an orifice in an outlet blocking plate portion of said baffle means of said adsorber assembly to receive gas, from within said adsorber assembly before said gas passes through any of said filter assemblies;

(2) a generally vertically oriented straight tube, of length at most equal to the distance by which said parallel vertical perforate walls of one of said filter assemblies are spaced apart, having inlet and outlet ends, said tube inlet end removably connected in fluid-tight relation to said conduit outlet end to receive vertically flowing gas therefrom for vertical flow through said tube, said tube outlet end positioned to exhaust any gas passing through said tube to a position downstream of said filter assemblies, said tube including a mesh at said outlet end thereof for retaining sample particulate adsorbent material within said tube by preventing vertically downward flow of sample particulate adsorbent material contained therewithin; and (3) free-standing uncompressed particulate adsorbent material occupying the entire volume of said tube.

15. The gas purifier of claim 14 wherein said particulate adsorbent material is silver zeolite.

16. The gas purifier of claim 14 wherein said two horizontally spaced parallel vertical walls of each said filter assembly are spaced apart a distance greater than the length of said straight tube.

17. The gas purifier of claim 16 wherein packing density of said particulate adsorbent material occupying said filter assemblies is substantially uniform and the same as packing density of said particulate adsorbent material within the volume of said straight tube.

18. The gas purifier of claim 14 wherein flow conductance through said filter assemblies is substantially the same as flow conductance through said sample canister.

19. The gas purifier of claim 14 wherein flow conductance through said filter assemblies is less than flow conductance through said sample canister.

20. The gas purifier of claim 14 wherein said particulate adsorbent material is activated carbon.

21. The gas purifier of claim 20 wherein said activated carbon is impregnated with a material selected from the group consisting of potassium iodide, elemental iodine, triethylene diamine and lead.

22. The gas purifier of claim 16 wherein said parallelepiped-shaped filter assemblies are right parallelepiped-shaped filter assemblies.

23. The gas purifier of claim 22 wherein said gas adsorber assembly further comprises:

(a) a pair of solid bottom walls below at least two filter assemblies, each solid bottom wall of said pair extending downwardly from an outer horizontal edge of an outwardly facing vertical perforate wall of an exterior filter assembly entirely along the horizontal length thereof, said solid bottom walls initially converging below said filter assemblies along a straight line inclined from horizontal at an angle greater than the angle of repose of said particulate adsorbent material, forming a throat and then diverging, said converging portions thereby forming a funnel-like trough below said filter assemblies along said length thereof, said throat portion extending said length of said filter assemblies, said diverging portion forming a downwardly diverging discharge chute extending horizontally said length of said filter assemblies, said discharge chute being of greater length at one end of said filter assemblies, of lesser length at an opposite end and tapering uniformly therebetween;

(b) a channel laterally extending exterior said discharge chute along said horizontal length thereof;

(c) a well, connected to said channel, extending horizontally said length of said discharge chute thereby surrounding said discharge chute; and (d) a pipe extending horizontally from the end of said well where said discharge chute is of greater length; whereby said trough and said discharge chute are filled with adsorbent material from said filter assemblies and said well has a heap of adsorbent material therein along the length thereof, said heap contacting and thereby closing said discharge chute along said entire horizontal length thereof; and wherein said straight tube further comprises:

(e) a plurality of interchangeable tubular segments; wherein a first tubular segment of said plurality is connected to said conduit and remaining tubular segments are connected to preceeding tubular segments such that said plurality of tubular segments are connected together seriatim, each segment including a mesh for retaining sample particulate adsorbent material within said segment by preventing vertically downward flow of any said sample particulate adsorbent material therefrom.

24. The gas purifier of claim 23 further comprising:
(a) at least one pipe, extending in said horizontal direction from the ends of said wells where said discharge chute is of greater length;
(b) a blower having its suction inlet removably connected to said pipes; whereby upon activation of said blower, said adsorbent material in said well closing said discharge chute will be pneumatically swept along said horizontal length of said discharge chute and pneumatically removed therefrom, said adsorbent material remote from said pipe being drawn out first, and adsorbent material in said filter assemblies above said pair of walls will progressively fall through said discharge chute thereby progressively replacing adsorbent material which has been drawn from said well until all adsorbent material is removed therefrom such that all adsorbent material in said filter assemblies above said pair of walls is removed therefrom with each said filter assembly emptying first from the corner remote from said pipe with adsorbent material in the corner diagonally opposite said remote corner and proximate said pipe being removed last; such that upon removal of said straight tube, all adsorbent material will be evacuated from said gas purifier.

25. Apparatus for use in gas filtering as a gas purifier, adapted to contain adsorbent material for adsorption of radioactive contamination from a gas stream passing therethrough, including a rechargeble gas adsorber assembly for containing adsorbent material, and apparatus for containing sample adsorbent material wherein any sample adsorbent material contained in said sample containment apparatus is exposed to contaminated gas flow at least as great as contaminated gas flow through any adsorbent material contained in said adsorber assembly, comprising in combination:

(a) a gas adsorber assembly for containing adsorbent material, comprising:

(1) a housing having a contaminated gas inlet and a filtered gas outlet and including inlet port means for passage therethrough of granular adsorbent material downward into filter assemblies within said housing;

(2) a plurality of vertically oriented vertically rechargeble parallelepiped-shaped filter assemblies within said housing, each filter assembly including two horizontally spaced-apart parallel vertical perforate walls having horizontally extending lower margins and two horizontally spaced-apart parallel vertical solid walls, said vertical perforate and solid walls connected along their vertically extending edges to form four vertical surfaces of said filter assembly, each said filer assembly being disposed for containment of freestanding uncompressed vertically charged adsorbent material in said parallelepiped defined by said two parallel perforate walls and said two parallel solid walls, for horizontal flow of gas therethrough, through said two perforate walls, said filter assemblies being generally parallel with one another and separated from one another and from said housing by spaces for gas flow; and (3) baffle means, rigidly connecting said filter assemblies together, in parallel spaced disposition one from another, and to said housing, for directing gas flow within said housing so some of said gas entering said gas purifier passes horizontally through one of said filter assemblies prior to exit from said gas purifier and remaining gas entering said gas purifier passes vertically through a sample canister apparatus prior to horizontal passage through said filter assemblies and exit from said gas purifier; said baffle means including:

(i) vertically upstanding imperforate inlet blocking plates extending the vertical height of said solid walls of said filter assemblies, positioned alternately between adjacent filter assemblies and between end assemblies of said plurality and said housing, secured along vertically extending margins thereof to said vertically extending solid walls of said adjacent filter assemblies and to said housing, proximate said gas inlet;

(ii) vertically upstanding imperforate outlet blocking plates, extending the vertical height of said solid walls of said filter assemblies, positioned alternately between adjacent filter assemblies, secured along vertically extending margins thereof to said adjacent filter assemblies proximate said filtered gas outlet; said outlet blocking plates closing alternate spaces between adjacent filter assemblies which lack an inlet blocking plate and hence are open at said contaminated gas inlet, said inlet blocking plates closing alternate spaces between adjacent filter assemblies and between end filter assemblies and said housing which lack an outboard blocking plate and hence are open at said filtered gas outlet;

(iii) imperforate top cover plates horizontally extending from vertical extremities of said inlet and outlet blocking plates the length of said filter assemblies between adjacent assemblies of said plurality and between end filter assemblies of said plurality and said housing, secured to said vertical perforate walls of said filter assemblies along upper horizontally extending margins thereof, for preventing granular adsorbent material entering said housing through said inlet port from occupying space between adjacent filter assemblies or between end filter assemblies and said housing;

(iv) imperforate bottom plates horizontally extending from lower extremities of said inlet and outlet blocking plates the length of said filter assemblies, between adjacent filter assemblies of said plurality and between end filter assemblies of said plurality and said housing, secured to said vertical perforate walls of said filter assemblies along lower horizontally extending margins thereof, for preventing granular adsorbent material from entering space between adjacent filter beds and between end filter beds and said housing, from below said filter beds; and (b) sample canister apparatus for containing sample adsorbent material, comprising:

(1) an imperforate conduit having inlet and outlet ends with a right-angle bend therebetween, said inlet end fluid-tightly connected to communicate with an orifice in an inlet blocking plate of said baffle means of said gas adsorber assembly to receive gas flowing horizontally thereinto before said gas passes through any of said filter assemblies;

(2) a generally vertically oriented imperforate straight tube, of length at most equal to distance by which said parallel vertical perforate walls of one of said filter assemblies are spaced apart, having inlet and outlet ends, said tube inlet end removably fluid-tightly connected to said conduit outlet end to receive vertically flowing gas therefrom, for containing a free-standing uncompressed column of sample adsorbent material for exposure thereof to any gas received as any said gas flows vertically through said tube, said tube including a mesh at said outlet end thereof for retaining sample adsorbent material within said tube by preventing vertically downward flow of any sample adsorbent material contained therewithin.

26. A gas purifier for adsorption of radioactive contamination from a gas stream passing therethrough, having a rechargeable gas adsorber assembly and a sample canister apparatus, wherein sample adsorbent material contained in said sample canister is exposed to contaminated gas flow at least as great as any contaminated gas flow through adsorbent material in said adsorber assembly, comprising in combination:

(a) a gas adsorber assembly comprising:

(1) a housing having a contaminated gas inlet and a filtered gas outlet;

(2) a plurality of vertically oriented vertically rechargeable parallelepiped-shaped filter assemblies within said housing, each filter assembly including two horizontally spaced-apart parallel vertical perforate walls having horizontally extending lower margins and two horizontally spaced-apart parallel vertical solid walls, said vertical perforate and solid walls connected along their vertically extending edges to form four vertical surfaces of said filter assembly, each said filter assembly being disposed for horizontal flow of gas therethrough, through said two parallel perforate walls and through granular particulate adsorbent material contained within said filter assembly between said perforate walls;

(3) free standing uncompressed granular particulate adsorbent material occupying the entire volume of each said parallelepiped-shaped assembly; and (4) baffle means rigidly connecting said filter assemblies in parallel spaced disposition one from another and to said housing, for directing gas flow within said housing so some gas entering said gas purifier passes horizontally through one of said filter assemblies while remaining gas entering said gas purifier passes vertically through a sample canister prior to horizontal passage through said filter assemblies and exit from said gas purifier; said baffle means including:

i. vertically upstanding imperforate inlet blocking plates extending the vertical height of said solid walls of said filter assemblies, positioned alternately between adjacent filter assemblies and between end assemblies of said plurality and said housing, secured along vertically extending margins thereof to said vertically extending solid walls of said adjacent filter assemblies and to said housing, proximate said gas inlet;

ii. vertically upstanding imperforate outlet blocking plates, extending the vertical height of said solid walls of said filter assemblies, positioned alternately between adjacent filter assemblies, secured along vertically extending margins thereof to said adjacent filter assemblies proximate said filtered gas outlet; said outlet blocking plates closing alternate spaces between adjacent filter assemblies which lack an inlet blocking plate and hence are open at said contaminated gas inlet, said inlet blocking plates closing alternate spaces between adjacent filter assemblies and between end filter assemblies and said housing which lack an outlet blocking plate and hence are open at said filtered gas outlet;

iii. imperforate top cover plates horizontally extending from vertical extremities of said inlet and outlet blocking plates the length of said filter assemblies between adjacent assemblies of said plurality and between end filter assemblies of said plurality and said housing, secured to said vertical perforate walls of said filter assemblies along upper horizontally extending margins thereof, for preventing granular adsorbent material entering said housing through said inlet port from occupying space between adjacent filter assemblies or between end filter assemblies and said housing;

iv. imperforate bottom plates horizontally extending from lower extremities of said inlet and outlet blocking plates the length of said filter assemblies, between adjacent filter assemblies of said plurality and between end filter assemblies of said plurality and said housing, secured to said vertical perforate walls of said filter assemblies along lower horizontally extending margins thereof, for preventing granular adsorbent material from entering space between adjacent filter beds and between end filter beds and said housing, from below said filter beds; and (b) a sample canister comprising:
  (2) an imperforate conduit having inlet and outlet ends with a right-angle bend therebetween, said inlet end connected fluid-tightly to communicate with an orifice in an inlet blocking plate of said baffle means of said gas adsorber assembly to receive gas flowing horizontally thereinto before said gas passes through any of said filter assemblies;
  (2) a generally vertically oriented imperforate straight tube, of length at most equal to the distance by which said parallel vertical perforate walls of one of said filter assemblies are spaced apart, having inlet and outlet ends, said tube inlet end removably fluid-tightly connected to said conduit outlet end to receive vertically flowing gas therefrom for vertical flow through said tube, said tube including a mesh at said outlet end thereof for retaining a free-standing uncompressed column of sample granular particulate adsorbent material within said tube by preventing vertically downward flow of sample particulate adsorbent material contained therewithin; and
  (3) free-standing uncompressed granular particulate adsorbent material occupying the entire volume of said tube.

* * * * *